(12) United States Patent
Takahashi et al.

(10) Patent No.: US 12,526,508 B2
(45) Date of Patent: Jan. 13, 2026

(54) OBSERVATION APPARATUS

(71) Applicant: FUJIFILM Corporation, Tokyo (JP)

(72) Inventors: Kosuke Takahashi, Saitama (JP); Shunsuke Miyagishima, Saitama (JP); Hiroki Saito, Saitama (JP); Tomoki Otsuki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 87 days.

(21) Appl. No.: 18/360,663

(22) Filed: Jul. 27, 2023

(65) Prior Publication Data

US 2023/0370712 A1    Nov. 16, 2023

Related U.S. Application Data

(63) Continuation of application No. PCT/JP2021/042380, filed on Nov. 18, 2021.

(30) Foreign Application Priority Data

Jan. 28, 2021   (JP) ................................ 2021-011985

(51) Int. Cl.
  *H04N 23/63*   (2023.01)
  *G03B 13/02*   (2021.01)
  *G03B 17/20*   (2021.01)
(52) U.S. Cl.
  CPC ........... *H04N 23/631* (2023.01); *G03B 13/02* (2013.01); *G03B 17/20* (2013.01)
(58) Field of Classification Search
  CPC .... H04N 23/631; H04N 23/63; H04N 23/635; G03B 13/02; G03B 17/20
  See application file for complete search history.

(56) References Cited

U.S. PATENT DOCUMENTS

2014/0002709 A1   1/2014  Sakurabu
2014/0375864 A1  12/2014  Miyagishima et al.
(Continued)

FOREIGN PATENT DOCUMENTS

JP    2003078785 A  *  3/2003
JP    2012-032622 A    2/2012
(Continued)

OTHER PUBLICATIONS

International Search Report issued in PCT/JP2021/042380; mailed Feb. 15, 2022.
(Continued)

*Primary Examiner* — Timothy J Henn
(74) *Attorney, Agent, or Firm* — Studebaker Brackett PLLC

(57) ABSTRACT

Provided is an observation apparatus capable of adjusting visibility of an image and of an optical image of a subject in consideration of an intensity of ambient light in a case where the image is displayed by being superimposed on the optical image. The observation apparatus (30) includes an optical system (32), a display mechanism (34) that displays an image based on a signal generated by an imaging element (20), and a light shielding mechanism (36) of which a light shielding rate is variable, and the optical image has a first optical region (OP1) and a second optical region (OP2). The display mechanism (34) superimposes the image on the first optical region (OP1) to display both the image and the optical image in an observable manner by a user. The light shielding mechanism (36) is disposed in an optical path between the subject and the display mechanism (34) and has a first light shielding region (36a) to be superimposed on the first optical region (OP1) and a second light shielding region (36b) to be superimposed on the second optical region (OP2). Control processing of controlling light shielding (Continued)

rates of the first light shielding region (36a) and of the second light shielding region (36b) based on the intensity of the ambient light is executed by the control unit (40) with respect to the light shielding mechanism (36).

9 Claims, 18 Drawing Sheets

(56) References Cited

U.S. PATENT DOCUMENTS

| | | | |
|---|---|---|---|
| 2015/0049236 A1* | 2/2015 | Kim | G03B 17/20 |
| | | | 348/333.09 |
| 2015/0109467 A1 | 4/2015 | Fujita et al. | |
| 2015/0124131 A1* | 5/2015 | Misawa | H04N 23/70 |
| | | | 348/294 |
| 2020/0228693 A1* | 7/2020 | Ishida | H04N 23/75 |
| 2020/0228694 A1 | 7/2020 | Ishida | |

FOREIGN PATENT DOCUMENTS

| | | | |
|---|---|---|---|
| JP | 2015-232665 A | 12/2015 | |
| JP | 2018-011152 A | 1/2018 | |
| WO | 2012/120952 A1 | 9/2012 | |
| WO | 2013/136907 A1 | 9/2013 | |
| WO | 2014/002658 A1 | 1/2014 | |
| WO | 2019/087713 A1 | 5/2019 | |
| WO | WO-2019087712 A1 * | 5/2019 | ............. G02F 1/163 |

OTHER PUBLICATIONS

International Preliminary Report on Patentability (Chapter I) and Written Opinion of the International Searching Authority issued in PCT/JP2021/042380; issued Jul. 31, 2023.

An Office Action; "Notice of Reasons for Refusal," mailed by the Japanese Patent Office on Jul. 1, 2025, which corresponds to Japanese Patent Application No. 2022-578068 and is related to U.S. Appl. No. 18/360,663; with English language translation.

* cited by examiner

| MODE | DISPLAY SIZE OF IMAGE | LIGHT SHIELDING RATE | |
|---|---|---|---|
| | | FIRST LIGHT SHIELDING REGION | SECOND LIGHT SHIELDING REGION |
| A MODE | STANDARD | 50% | 20% |
| B MODE | ENLARGED | 80% | 10% |
| C MODE | STANDARD | 95% | 5% |

OBSERVATION APPARATUS

CROSS-REFERENCE TO RELATED APPLICATIONS

This application is a Continuation of PCT International Application No. PCT/JP2021/042380 filed on Nov. 18, 2021, which claims priority under 35 U.S.C. § 119(a) to Japanese Patent Application No. 2021-011985 filed on Jan. 28, 2021. The above applications are hereby expressly incorporated by reference, in their entirety, into the present application.

BACKGROUND OF THE INVENTION

1. Field of the Invention

One embodiment of the present invention relates to an observation apparatus for an imaging apparatus and, more particularly, to an observation apparatus capable of observing both an optical image of a subject and a captured image.

2. Description of the Related Art

A user of an imaging apparatus, such as a digital camera, uses a view finder for a camera, that is, an observation apparatus for an imaging apparatus, for the purpose of setting an imaging range (angle of view) or the like. In addition, in the observation apparatuses, there is a so-called hybrid type observation apparatus (hereinafter, also referred to as HVF), which has both a function of an optical view finder and a function of an electronic view finder.

In the HVF, for example, an optical image of a subject is formed by an optical system in the HVF while the captured image is displayed on a display device in the HVF (see, for example, JP2015-232665A). As a result, the captured image is displayed by being superimposed on the optical image of the subject, and the user of the HVF can observe both the captured image and the optical image of the subject via one eyepiece portion.

SUMMARY OF THE INVENTION

In the HVF, there may be a case where ease of visibility of an image, which is displayed by being superimposed on the optical image of the subject, varies depending on an intensity of light (ambient light) in the imaging environment. For example, outdoors during the daytime, the optical image appears brighter due to incidence light entering the HVF, which may make it difficult to see the image.

In addition, in a case of adjusting the brightness of an image in order to improve the visibility of the image, it is necessary to adjust the brightness of both the image and the optical image in a well-balanced manner in consideration of the visibility of the optical image.

One embodiment of the present invention has been made in view of the above circumstances, and an object of the present invention is to provide an observation apparatus capable of adjusting the visibility of an image and of an optical image of a subject in a case where the image is displayed by being superimposed on the optical image.

In order to achieve the above-described object, one embodiment of the present invention relates to an observation apparatus that is for an imaging apparatus including an imaging element and is controlled by a control unit, the observation apparatus comprising: an optical system that forms an optical image of a subject in an observable manner by a user; a display mechanism that displays an image in an observable manner by the user; and a light shielding mechanism of which a light shielding rate is variable by an electrical signal, in which the optical image has a first optical region and a second optical region, the image is an image based on a signal generated by the imaging element, the display mechanism superimposes the image on the first optical region to display both the image and the optical image in an observable manner by the user, the light shielding mechanism is disposed in an optical path between the subject and the display mechanism and has a first light shielding region to be superimposed on the first optical region and a second light shielding region to be superimposed on the second optical region, and control processing of controlling light shielding rates of the first light shielding region and of the second light shielding region based on an intensity of ambient light is executed by the control unit with respect to the light shielding mechanism.

In addition, the control processing may be executed with respect to the light shielding mechanism based on an output signal of a sensor that outputs a signal corresponding to the intensity.

Further, the imaging element may generate a signal obtained by imaging a part of the subject to be observed as the optical image. In this case, in the control processing, the light shielding rate of the first light shielding region may be controlled based on the signal generated by the imaging element and the output signal of the sensor.

In addition, an end part of the first light shielding region may be located outward of an end part of a display region of the image.

Further, in the control processing, a light shielding rate of an end part region of the second light shielding region may be controlled to be lower than a light shielding rate of a central region of the second light shielding region.

In addition, the display mechanism may include a display device having light transmittance. In this case, the image may be displayed in a part of the display device, which corresponds to the first optical region, in a state in which the optical image is transmitted through the display device such that the user observes both the image and the optical image through the observation apparatus.

Further, an image of an in-focus region and an image of an out-of-focus region other than the in-focus region may be present in the image. In this case, in the control processing, a light shielding rate of a region of the first light shielding region, which overlaps the image of the in-focus region, may be controlled to be higher than a light shielding rate of a region overlapping the image of the out-of-focus region.

In addition, an image of an in-focus region and an image of an out-of-focus region other than the in-focus region may be present in the image. In this case, a display format of the image of the in-focus region may be different from a display format of the image of the out-of-focus region.

Further, correction processing of correcting a gradation value corresponding to the signal generated by the imaging element may be performed, the display mechanism may display the image based on the corrected gradation value, and a correction amount for the gradation value in the correction processing may be set according to the intensity.

In addition, the display mechanism may display a marker indicating an imaging range of the imaging element together with the image. In this case, in an overlapping region where a display region of the marker and a display region of the image overlap each other in the display mechanism, out of the marker and the image, one may be preferentially displayed over the other.

In addition, in the overlapping region, out of the marker and the image, one selected by the user may be preferentially displayed over the other.

In addition, the observation apparatus according to one embodiment of the present invention may be for the imaging apparatus including the control unit.

In addition, another embodiment of the present invention relates to an observation apparatus that is for an imaging apparatus including an imaging element and is controlled by a control unit, the observation apparatus comprising: an optical system that forms an optical image of a subject in an observable manner by a user; a display mechanism that displays an image in an observable manner by the user; and a light shielding mechanism of which a light shielding rate is variable by an electrical signal, in which the optical image has a first optical region and a second optical region, the display mechanism superimposes the image on the first optical region to display both the image and the optical image in an observable manner by the user, the light shielding mechanism is disposed in an optical path between the subject and the display mechanism and has a plurality of light shielding regions to be superimposed on the first optical region and the second optical region, control processing is executed by the control unit with respect to the display mechanism and the light shielding mechanism, and, in the control processing, from a storage device that stores a display size of the image in the display mechanism and light shielding rates corresponding to the plurality of light shielding regions, the display size and the light shielding rates corresponding to the plurality of light shielding regions are read out in response to an input operation of the user.

In the above configuration, the display size and the light shielding rates corresponding to the plurality of light shielding regions may be stored in the storage device in a state of being associated with any one of a plurality of modes, respectively. In this case, the input operation may be an operation in which the user designates any one of the plurality of modes, and, in the control processing, the display size and the light shielding rates corresponding to the plurality of light shielding regions may be read out from the storage device based on a mode designated by the user.

In addition, still another embodiment of the present invention relates to an observation apparatus that is for an imaging apparatus including an imaging element and is controlled by a control unit, the observation apparatus comprising: an optical system that forms an optical image of a subject in an observable manner by a user; and a display mechanism that displays an image in an observable manner by the user, in which the optical system includes a lens, the optical image has a first optical region and a second optical region, the display mechanism superimposes the image on the first optical region to display both the image and the optical image in an observable manner by the user, and overlays and displays a marker surrounding an imaging range by the imaging element on the second optical region, the image is displayed in a state in which correction corresponding to distortion due to the lens is performed, and the marker is displayed in a state in which the correction is not performed or in a state in which correction weaker than the correction of the image is performed, based on a positional relationship between the imaging range and the optical image to be observed in a state in which the distortion has occurred.

DESCRIPTION OF THE PREFERRED EMBODIMENTS

Hereinafter, preferred embodiments (first to third embodiments) of the present invention will be described in detail with reference to the accompanying drawings. It should be noted that the embodiments to be described below are merely examples for facilitating the understanding of the present invention and do not limit the present invention. That is, the present invention may be modified or improved from the embodiments to be described below without departing from the gist of the present invention. In addition, the present invention includes an equivalent thereof.

First Embodiment

The first embodiment of the present invention relates to an observation apparatus for an imaging apparatus. An imaging apparatus 10 according to the first embodiment constitutes, for example, a digital camera shown in FIG. 1. An observation apparatus 30 according to the first embodiment is composed of a view finder for a camera. In the configuration shown in FIG. 1, the observation apparatus 30 is incorporated in the imaging apparatus 10. Here, the imaging apparatus 10 means a part of the digital camera excluding the observation apparatus 30. In addition, a user is a user of the imaging apparatus 10 and also corresponds to a user of the observation apparatus 30.

[Basic Configuration of Imaging Apparatus]

Figure 1:
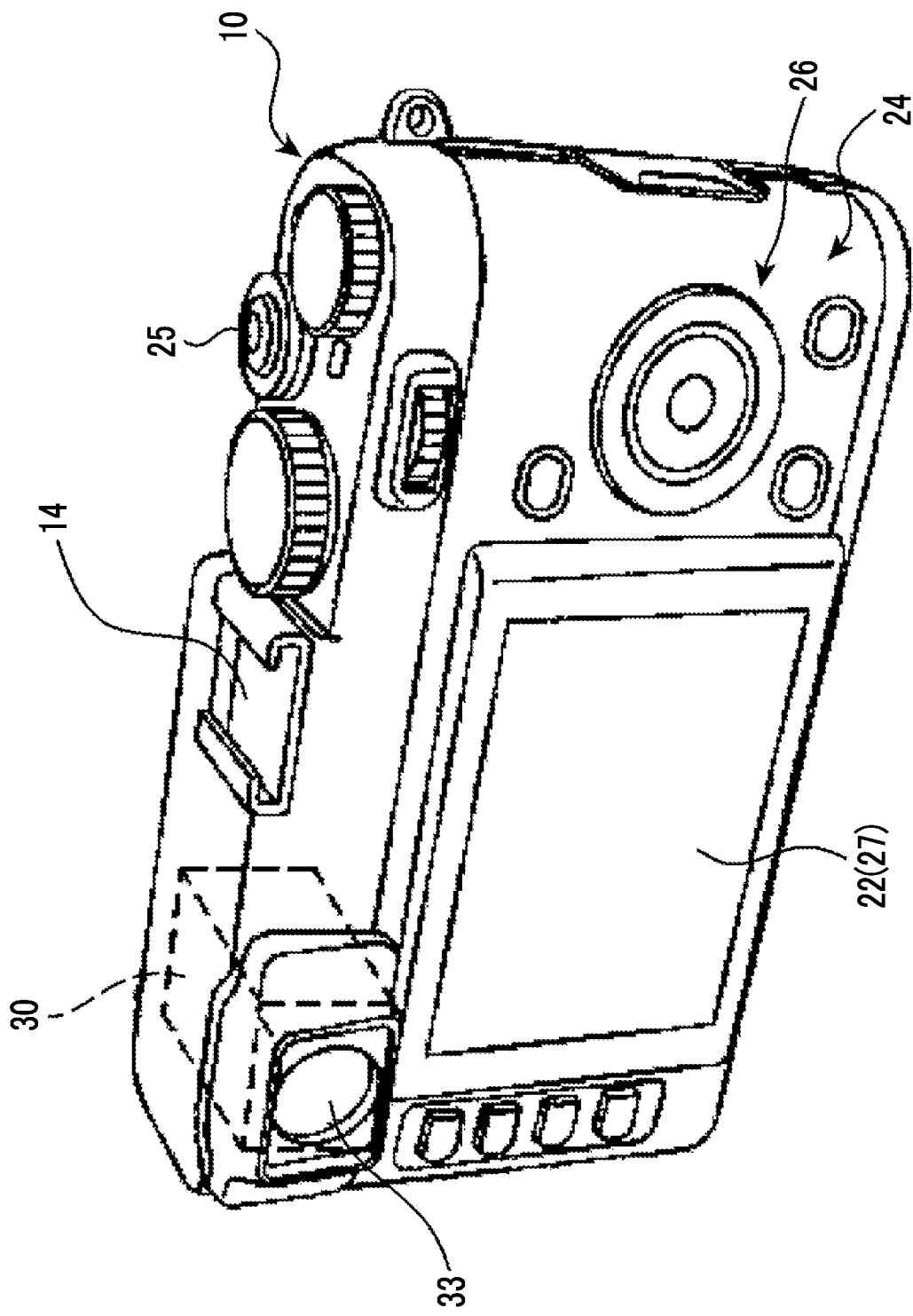
FIG. 1 is a diagram showing an external appearance of an imaging apparatus and an observation apparatus according to one embodiment of the present invention.
Figure 2:
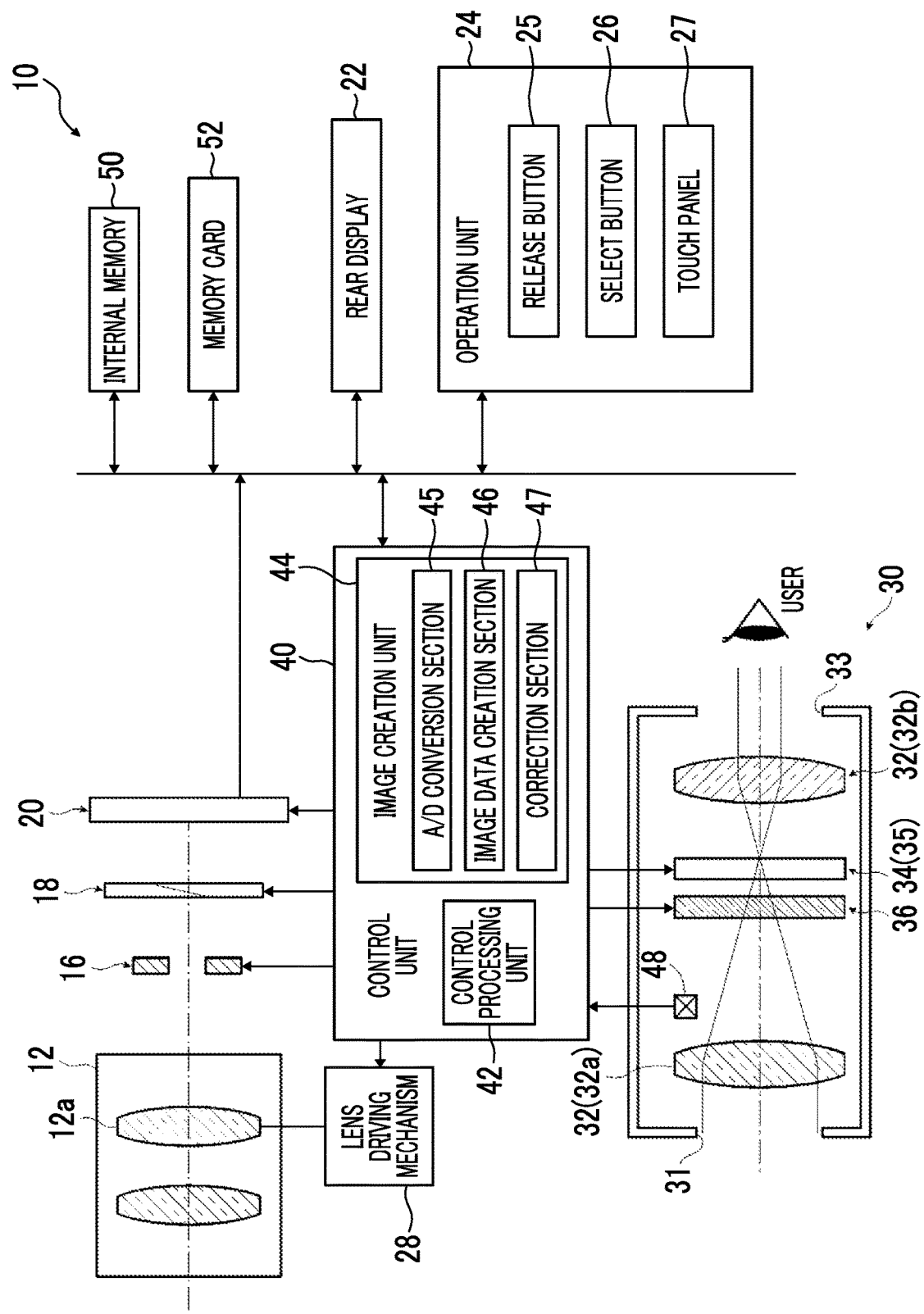
FIG. 2 is a diagram showing a configuration of the imaging apparatus and the observation apparatus according to one embodiment of the present invention.

As shown in FIGS. 1 and 2, the imaging apparatus 10 comprises an imaging lens 12, a stop 16, a shutter 18, an imaging element 20, a rear display 22, an operation unit 24, a lens driving mechanism 28, a control unit 40, an internal memory 50, and the like.

The imaging apparatus 10 is a model with an integrated lens or a model with an interchangeable lens, and performs imaging at an angle of view corresponding to the imaging lens 12. During the imaging, light transmitted through the imaging lens 12 is incident on the imaging element 20. The amount of incidence light entering the imaging element 20 is controlled by adjusting the F-number of the stop 16. The exposure time at the time of imaging is controlled by adjusting the shutter speed of the shutter 18. The exposure conditions, such as the F-number, the shutter speed, and the ISO sensitivity, are controlled by the control unit 40.

The imaging lens 12 may be a telephoto lens. In addition, a focus lens 12a included in the imaging lens 12 is movable in an optical axis direction thereof by the lens driving mechanism 28. That is, in the imaging apparatus 10, the focus (focusing position) is variable.

The imaging element 20 includes a known image sensor, for example, a charged coupled device (CCD), a complementary metal oxide semiconductor image sensor (CMOS), an organic imaging element, or the like. The imaging element 20 receives light (which is not limited to visible light) from a subject within the angle of view, converts the received light image into an electrical signal, and generates and outputs a converted signal.

The rear display 22 is provided on a rear surface of the imaging apparatus 10 and displays an image and various types of information, for example, displays a live view image during imaging. The live view image is an image (captured image) based on the signal generated by the imaging element 20 and is a real-time image of the subject during imaging.

The operation unit 24 is provided on an outer surface of the imaging apparatus 10 and receives an operation by the user. As shown in FIG. 2, the operation unit 24 includes a release button 25, a cross key type or control wheel type select button 26, a touch panel 27 provided on the rear display 22, and the like. The release button 25 is pressed in a case where the user issues an instruction to store the captured image. The select button 26 and the touch panel 27 are operated, for example, in a case where the user performs mode selection, condition setting, or the like.

The observation apparatus 30 is an observation apparatus for the imaging apparatus 10 and is a peeping-type finder used by the user to set the angle of view or to confirm the subject during imaging. The observation apparatus 30 is a hybrid type finder (HVF) that has both a function as an optical view finder (OVF) and a function as an electronic view finder (EVF).

That is, in the observation apparatus 30, the optical image of the subject is formed in an observable manner by the user through the function of the OVF, and the captured image is displayed in an observable by the user through the function of the EVF. Here, displaying the image by forming the optical image in an observable manner by the user means displaying the image by forming the optical image such that the optical image fits within the visual field of the user in a case where the user peeps into the observation apparatus 30.

Figure 3:
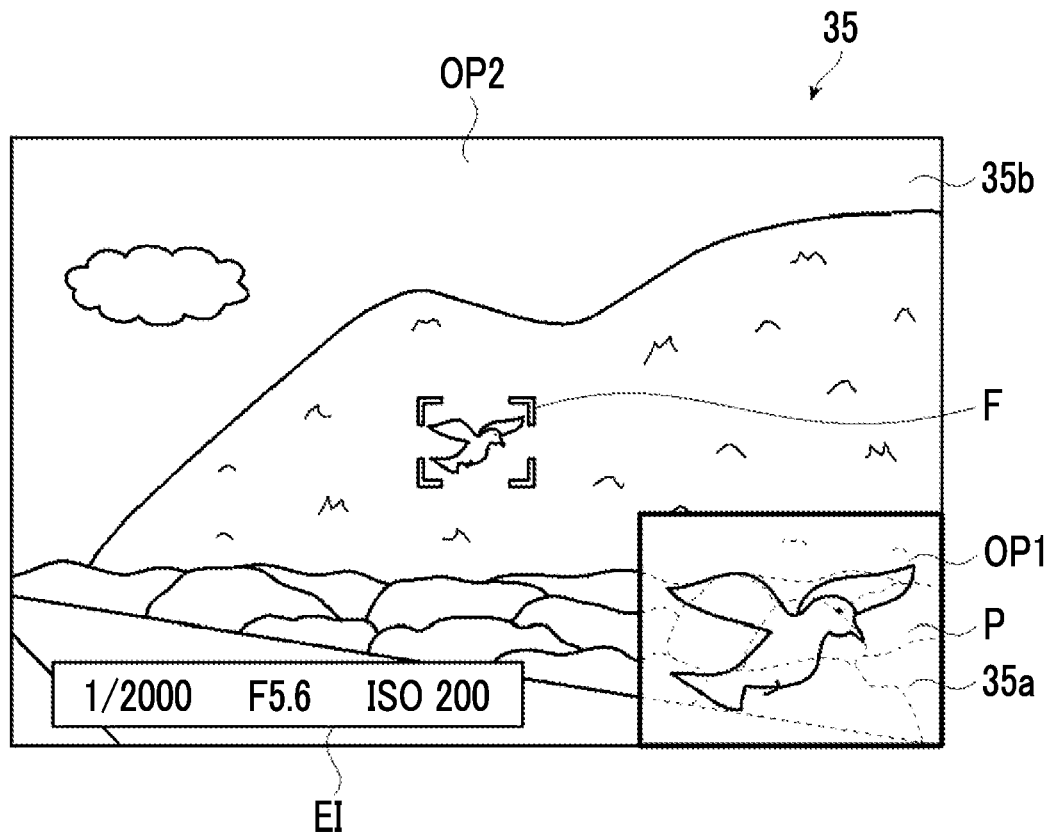
FIG. 3 is a diagram showing an image and an optical image to be observed through the observation apparatus.

Further, in a case where the imaging lens 12 is a telephoto lens, as shown in FIG. 3, an image P (specifically, a live view image) to be displayed in the observation apparatus 30 is an image obtained by imaging a distant subject at a narrow angle of view. Meanwhile, in the observation apparatus 30, the optical image of the subject is observable in a relatively wide range, and the subject to be observed as the optical image includes a subject that is captured in the image P. That is, the imaging element 20 generates a signal by imaging a part of the subject to be observed as the optical image by the observation apparatus 30.

In FIG. 3, a plurality of the images P may be displayed. In a case where the plurality of images P are displayed, it is preferable to display, in addition to the image of the entire angle of view of the imaging lens 12, an image in which the focusing position of the imaging lens 12 is enlarged and/or a face of a person detected by the imaging apparatus 10 is enlarged.

With the observation apparatus 30 having the above configuration, operability in a case where the user images a moving object such as a person, an animal, or a vehicle located far away as the subject is improved. Specifically, in a case where the moving object deviates from the angle of view, the moving object is no longer captured in the image P. Even in this case, the moving object outside the angle of view can be easily tracked by confirming the optical image on which the image P is superimposed in the observation apparatus 30, that is, the subject in a wider range.

Regarding the observation apparatus 30, a detailed description will be provided in a later section.

The control unit 40 is configured to control each part of the imaging apparatus 10 to execute various types of processing including imaging, recording of an image, display of an image, and the like. The control unit 40 is composed of a processor. The processor may be composed of one or a plurality of hardware devices, for example, a central processing unit (CPU), a field programmable gate array (FPGA), a digital signal processor (DSP), an application specific integrated circuit (ASIC), a graphics processing unit (GPU), or other integrated circuits (ICs). Alternatively, a processor may be composed of a combination of these.

In addition, as for the processor forming the control unit 40, the entire function of the control unit 40 may be configured by one integrated circuit (IC) chip, as represented by a system on chip (SoC) or the like. The hardware configuration of the processor described above may be realized by an electric circuit (circuitry) in which circuit elements such as semiconductor elements are combined.

The internal memory 50 is an example of the storage device, and the internal memory 50 stores a program executed by the control unit 40. This program is executed by the processor so that the processor functions as the control unit 40.

The program executed by the processor is not limited to a case of being necessarily stored in the internal memory 50, and may be stored in a memory card 52, which is an example of the storage device. The memory card 52 is used by being inserted into a card slot (not shown) provided in the imaging apparatus 10.

The control unit 40 stores data necessary for the control unit 40 to execute various types of processing, such as a control pattern for correction, which will be described later. It should be noted that, in a case where the control unit 40 is outside the imaging apparatus 10 (that is, in a case where the control unit 40 is provided separately from an imaging apparatus main body other than the control unit), the above data may be stored in the storage device consisting of the internal memory 50 and the memory card 52. In a case where the processor constituting the control unit 40 can communicate with an external server (for example, a server for a cloud service) via the Internet, a mobile communication line, or the like, the above data may be stored in the external server.

As shown in FIG. 2, the control unit 40 includes a control processing unit 42 and an image creation unit 44. The control processing unit 42 is configured to control each part of the imaging apparatus 10 in response to an operation of the user, which is received via the operation unit 24, or in accordance with a predetermined control rule. For example, the control processing unit 42 controls the stop 16, the shutter 18, and the imaging element 20 according to the intensity of light in the imaging environment (hereinafter, referred to as ambient light) to automatically change the exposure conditions. In addition, in a case where the release button 25 is pressed, the control processing unit 42 causes the internal memory 50 or the like to record the data of the image captured at that point in time.

In addition, the control processing unit 42 causes a display mechanism 34 of the observation apparatus 30 or the rear display 22 to display an image based on image data created by the image creation unit 44 during the imaging. Whether to display the image on the rear display 22 or on the display mechanism 34 may be decided on a user side or may be automatically decided on a control unit 40 side. For example, in a case where a distance between the user and the imaging apparatus 10 is equal to or less than a predetermined distance, the control processing unit 42 automatically sets the display mechanism 34 as a display destination of the image.

Hereinafter, image data recorded in the internal memory 50 or the like will be referred to as "recorded image data", and image data displayed on the rear display 22 or on the display mechanism 34 will be referred to as "display image data".

In addition, the control processing unit 42 drives the lens driving mechanism 28 to move the focus lens 12*a*, thereby automatically adjusting the focus (focusing position). In the autofocus processing, for example, directional optical autofocus, such as contrast autofocus, image plane phase difference autofocus, laser autofocus, and a method of Time of Flight, autofocus of a Depth-from-Defocus method (DFD method), and the like, can be used.

In addition, the control processing unit 42 can derive a focus position (focusing position) in the image based on the autofocus technology and can identify an image of an in-focus region and an image of an out-of-focus region other than the in-focus region in the captured image. The image of the in-focus region is an image of a part that is present in the captured image and is an image of a region that is focused (in focus).

In addition, the control processing unit 42 can detect the intensity of the ambient light. The ambient light includes the light emitted from the subject and all the light in the entire environment where the imaging apparatus 10 is present, such as external light that illuminates the periphery of the imaging apparatus 10. In the first embodiment, the intensity of the ambient light is detected based on an output signal of a sensor 48 for photometry, which will be described later, and the signal generated by the imaging element 20 consisting of the image sensor. In a case where the intensity of the ambient light is detected based on the signal generated by the imaging element 20, for example, an integrated value of an exposure amount from the signal, specifically, an exposure amount calculated for automatic exposure control or auto white balance control, is calculated.

The image creation unit 44 is configured to create recorded image data and display image data of the captured image. The display image data may also be used as the recorded image data. As shown in FIG. 2, the image creation unit 44 includes an analog/digital (A/D) conversion section 45, an image data creation section 46, and a correction section 47.

The A/D conversion section 45 converts the signal generated by the imaging element 20 from an analog signal to a digital signal. The image data creation section 46 performs image processing, such as white balance correction, on the converted digital signal and compresses the processed signal with a predetermined standard to create image data.

The image data is data that indicates a gradation value of each part of the angle of view at the time of imaging, specifically, a gradation value of three RGB colors (hereinafter, referred to as an input gradation value), for each pixel. The input gradation value is defined within a numerical range including a lower limit value, an upper limit value, and an intermediate value located between these, and is defined, for example, within a numerical range of 0 to 255 in a case where the image data is 8-bit format data.

The correction section 47 executes correction processing in order to create the display image data from the image data created by the image data creation section 46. As a specific example, the correction section 47 performs γ correction to obtain an output value corresponding to the input gradation value indicated by the image data. Here, the output value corresponding to the input gradation value is a gradation value corresponding to the signal generated by the imaging element 20 and is defined within the same numerical range as the input gradation value. The correction processing may be another gradation correction processing such as knee correction, for example.

Figure 5:
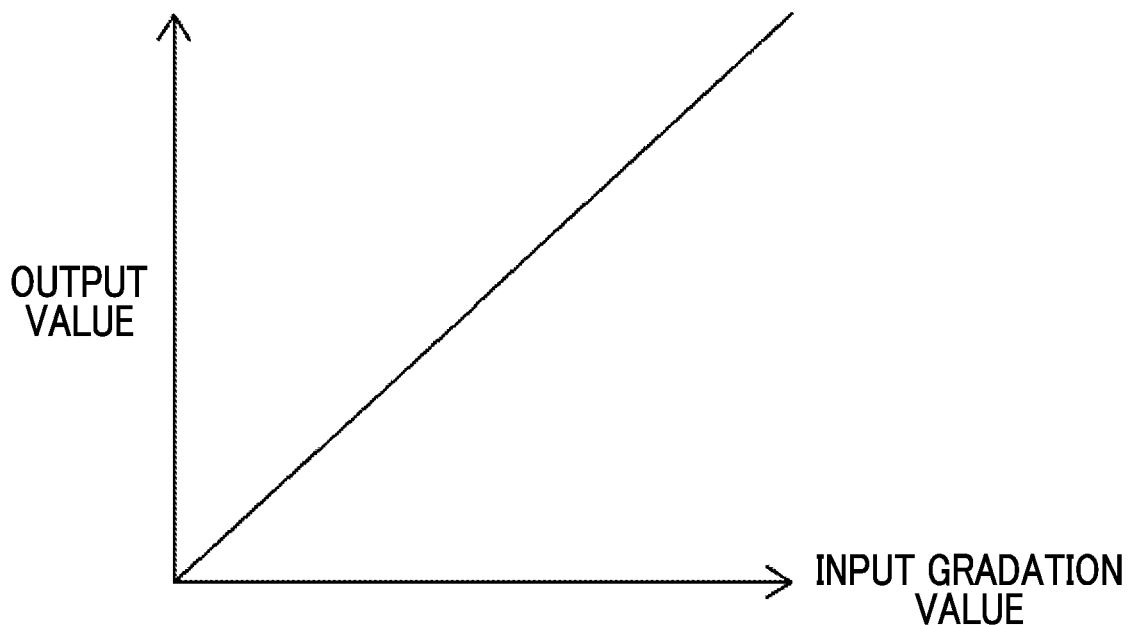
FIG. 5 is a diagram showing a correspondence relationship between an input gradation value and an output value in γ correction.

In the γ correction, the input gradation value is converted into the output value in accordance with a certain conversion rule, and the output value is obtained, for example, in accordance with a linear relationship shown in FIG. 5. In the first embodiment, the correction section 47 can perform additional correction on the gradation value (output value) after the γ correction. The additional correction is a correction that changes the output value from a value obtained in a case where the γ correction is performed, and is performed, for example, in a case where the output value satisfies a predetermined condition.

The additional correction includes a first additional correction and a second additional correction, and a correction amount in each of the additional corrections is set according to the intensity of the ambient light detected by the control processing unit 42.

The first additional correction is a so-called shadow correction, and in the first additional correction, the output value for a low gradation part (dark portion) where the input gradation value indicated by the image data is equal to or less than a first reference value is raised higher than a normal value (the value obtained in a case where only the γ correction is performed). The first reference value (Va in FIG. 6) is set to a numerical value corresponding to ⅓ to ¼ of an intermediate value in a numerical range (for example, 0 to 255) that defines the input gradation value.

Figure 7:
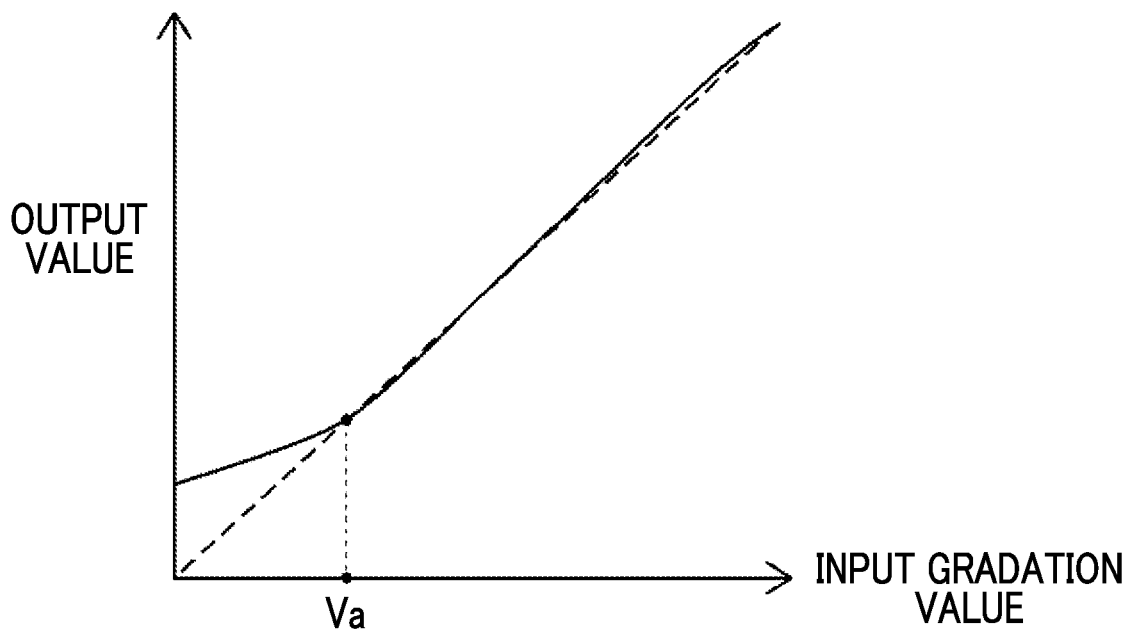
FIG. 7 is a diagram showing another example of the first gradation correction.

According to the first additional correction, the output value of the low gradation part is corrected from a value on a broken line to a value on a solid line in FIG. 7 and becomes a gradation value higher than the normal value. That is, the brightness of the low gradation part after the first additional correction is performed is brighter than the brightness in a case where the first additional correction is not performed. As a result, for example, the visibility of the dark portion, which is too dark to be visually recognized with a normal output value, is improved.

Figure 6:
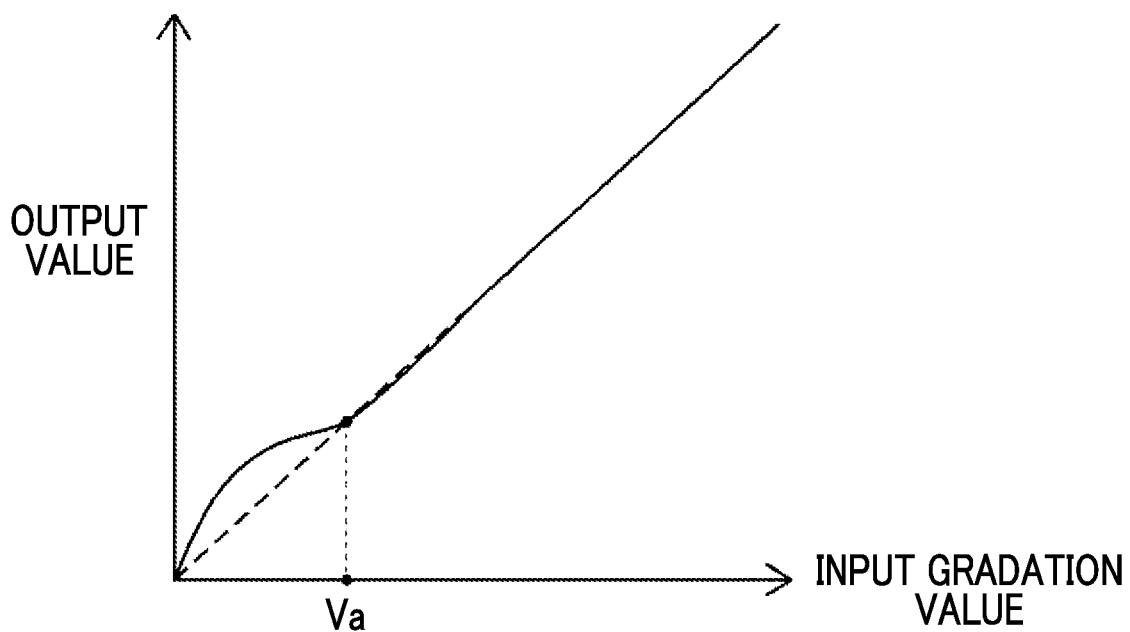
FIG. 6 is a diagram showing an example of first gradation correction.

In a case where the correction amount is increased in performing the first additional correction for a region where the input gradation value is near the lower limit value in the low gradation part, the region may appear brighter in the display image even though the region actually appears dark. As a result, the difference in brightness in the display image may deviate from the actual appearance. Therefore, in consideration of the balance with the actual appearance, in the region where the input gradation value is near the lower limit value, as shown in FIG. 6, the correction amount of the first additional correction need only be gradually decreased as the input gradation value decreases. However, the present invention is not limited to this, and as shown in FIG. 7, the correction amount may be increased as a difference between the input gradation value and the first reference value Va increases over the entire region of the low gradation part including the region where the input gradation value is near the lower limit value.

The second additional correction is a so-called highlight correction, and in the second additional correction, the output value for a high gradation part (bright portion) where the input gradation value indicated by the image data is equal to or greater than a second reference value is lowered lower than the normal value (the value obtained in a case where only the γ correction is performed). The second reference value (Vb in FIG. 8) is set to a numerical value corresponding to ⅔ to ¾ of an intermediate value in a numerical range (for example, 0 to 255) that defines the input gradation value.

Figure 8:
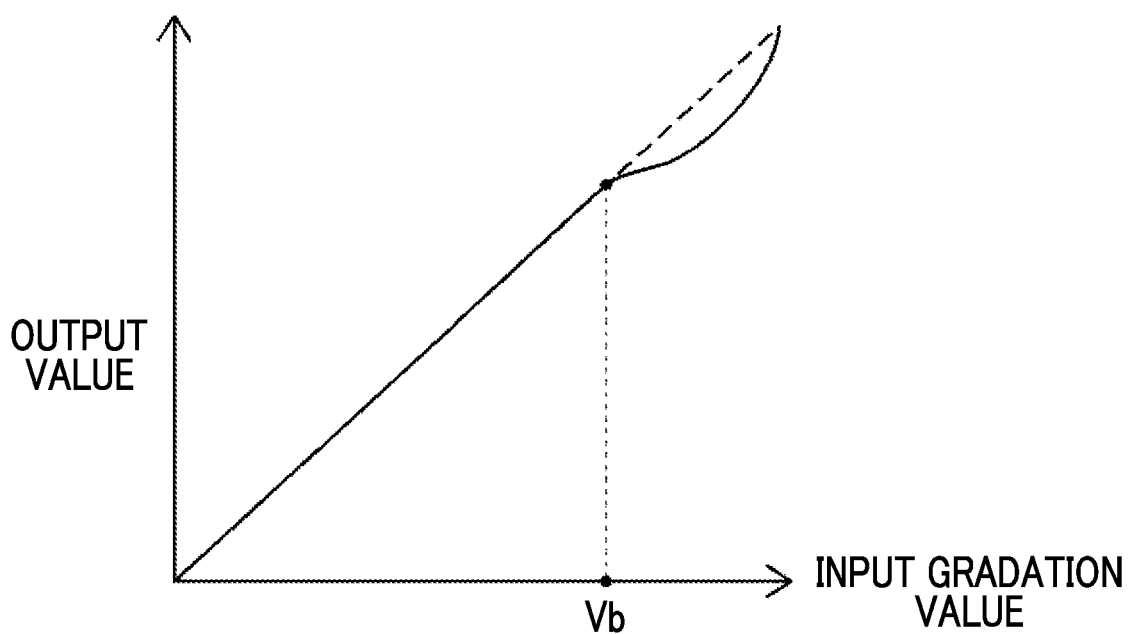
FIG. 8 is a diagram showing an example of a second gradation correction.

According to the second additional correction, the output value of the high gradation part is corrected from a value on a broken line to a value on a solid line in FIG. 8 and becomes a gradation value lower than the normal value. That is, the brightness of the high gradation part after the second additional correction is performed is darker than the brightness in a case where the second additional correction is not performed. As a result, for example, visibility of a bright portion, which is too bright to be visually recognized with a normal output value, is improved.

Figure 9:
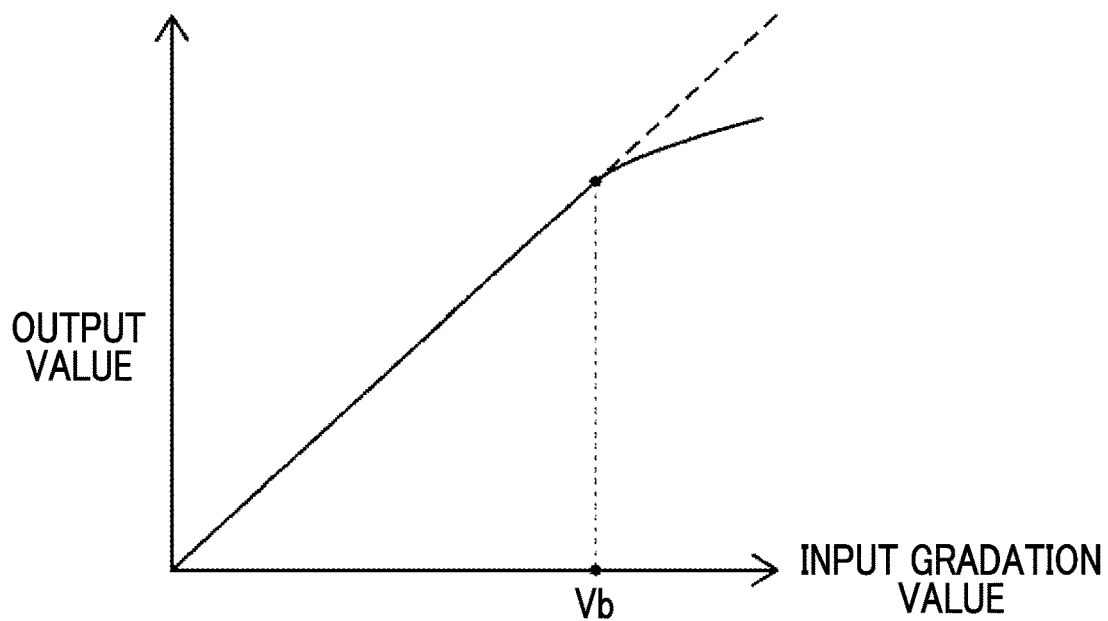
FIG. 9 is a diagram showing another example of the second gradation correction.

Similarly to the low gradation part, for the high gradation part, in consideration of the balance with the actual appearance, in the region where the input gradation value is near the upper limit value, as shown in FIG. 8, the correction amount of the second additional correction need only be gradually decreased as the input gradation value increases. However, the present invention is not limited to this, and as shown in FIG. 9, the correction amount may be increased as a difference between the input gradation value and the second reference value Vb increases over the entire region of the high gradation part including the region where the input gradation value is near the upper limit value.

A plurality of the control patterns for additional correction are prepared and are stored in the storage device such as the internal memory 50, the memory card 52, or the external server. The correction section 47 reads out a control pattern corresponding to the intensity of the ambient light out of the plurality of control patterns and performs additional correction based on the read-out control pattern.

As described above, in the present embodiment, in a case where the low gradation part (dark portion) or the high gradation part (bright portion) is present in the captured image, additional correction is performed in addition to the γ correction, so that the display image data can be created such that the visibility is improved. Instead of performing the additional correction, the correction pattern of the γ correction (that is, the conversion pattern from the input gradation value to the output value) may be changed according to the intensity of the ambient light.

Further, the correction related to the output value, that is, the γ correction and the additional correction, is not limited to a case of being performed by the control unit 40 consisting of the processor. For example, in a module of the rear display 22 or a module of a display device 35 provided in the observation apparatus 30, the above-described correction may be performed by the control circuit in the module.

In addition, in a case where the display image data is created by performing the additional correction, the display image data is not recorded, and only the image data before the correction (the image data created by performing only the γ correction) may be recorded as the recorded image data. Alternatively, the display image data created by performing the additional correction may be separately recorded as the recorded image data together with the image data before the correction.

Hereinafter, unless otherwise specified, the operation and processing of each of the control processing unit 42 and the image creation unit 44 will be described as the operation and processing of the control unit 40 (processor).

[Configuration of Observation Apparatus]

The observation apparatus 30 is an observation apparatus (finder) for the imaging apparatus 10 including the control unit 40 and is housed in, for example, a housing of the imaging apparatus 10. As shown in FIG. 2, the observation apparatus 30 includes an introduction window 31, an optical system 32, an eyepiece window 33, a display mechanism 34, a light shielding mechanism 36, and the sensor 48 for photometry. The display mechanism 34 and the light shielding mechanism 36 are controlled by the control unit 40, and the output signal of the sensor 48 is transmitted to the control unit 40.

The introduction window 31 is provided on a front surface of the imaging apparatus 10 in order to guide light (luminous flux) from the subject into the inside of the observation apparatus 30. The eyepiece window 33 is provided on a rear surface of the imaging apparatus 10 in order for the user to peep into the inside of the observation apparatus 30.

The optical system 32 forms an optical image of the subject in an observable manner by the user. As shown in FIG. 2, the optical system 32 includes a plurality of lenses 32a and 32b. One lens 32a (hereinafter, referred to as an upstream lens 32a) is disposed at a position closer to the subject and is provided in order to form the optical image of the subject on the display mechanism 34. The other lens 32b (hereinafter, referred to as a downstream lens 32b) is disposed at a position closer to the user and is provided in order to enlarge the optical image formed by the display mechanism 34 and the image displayed on the display mechanism 34.

In addition to the lenses 32a and 32b, the optical system 32 may include a reflection mirror and a prism for changing the optical path, a half mirror for transmitting light advancing in a predetermined direction, a focus plate (focal plate) for forming the optical image, and the like.

The display mechanism 34 includes the display device 35 shown in FIG. 2 and displays an image and various types of information on the display device 35 in an observable manner by the user during imaging. The display device 35 is disposed between the upstream lens 32a and the downstream lens 32b in the optical path of light (luminous flux) from the subject, which is introduced into the observation apparatus 30.

In the first embodiment, the display device 35 has light transmittance and is composed of, for example, a transmissive display. As the transmissive display, a self-emitting organic electro luminescence (EL) panel having a thin thickness or the like can be used. In addition, the brightness (level of brightness) of each region of the display device 35 is variable and can be controlled for each region. Here, the region in the display device 35 corresponds to a range that occupies a part of the display screen formed by the display device 35.

The light shielding mechanism 36 is a dimming member provided in order to shield light (luminous flux) from the subject, which is introduced into the observation apparatus 30. The light shielding mechanism 36 is composed of, for example, a polymer-dispersed liquid crystal panel, an electrochromic sheet, or a neutral density (ND) filter which is a light attenuating filter. As shown in FIG. 2, the light shielding mechanism 36 is disposed in the optical path between the subject and the display mechanism 34 and more specifically, is disposed between the upstream lens 32a and the display device 35.

The light shielding rate of the light shielding mechanism 36 is variable, varies according to an electrical signal input to the light shielding mechanism 36, and specifically, varies according to a value of an applied voltage or a current value flowing through a circuit in the light shielding mechanism 36. Further, the light shielding rate of the light shielding mechanism 36 can be controlled for each region. Each region (light shielding region) in the light shielding mechanism 36 refers to each part of the liquid crystal panel, the electrochromic sheet, or the ND filter forming the light shielding mechanism 36 and corresponds to the region of the light shielding device 35. Furthermore, the plane size of the light shielding mechanism 36 is larger than the plane size of the display device 35. Therefore, in a case where the light shielding rate of the entire region of the light shielding mechanism 36 is substantially 100%, the light introduced into the observation apparatus 30 and directed to the eyepiece window 33 is substantially completely shielded by the light shielding mechanism 36 at a position in front of the display device 35.

The sensor 48 for photometry is installed inside the observation apparatus 30, outputs a signal corresponding to the intensity of the ambient light, and specifically, outputs a signal corresponding to the intensity of light incident into the observation apparatus 30 from the introduction window 31. The sensor 48 for photometry is not limited to a case of being provided inside the observation apparatus 30 and may be provided inside the imaging apparatus 10.

The observation apparatus 30 configured as described above operates under the control of the control unit 40 during imaging. Specifically, the control unit 40 controls the display mechanism 34 based on the display image data to display the image P (specifically, the live view image) indicated by the display image data on the display device 35. In this case, in a case where the above-described additional correction is performed on the image P, the control unit 40 causes the display device 35 to display the corrected image P, that is, an image in which the output value (level of brightness) of the dark portion or the bright portion is corrected.

Meanwhile, light (luminous flux) from the subject is introduced into the observation apparatus 30 through the introduction window 31. In this case, in a case where the light shielding rate of each light shielding region in the light shielding mechanism 36 is sufficiently low, the luminous flux is focused toward the display device 35 by the upstream lens 32a, and as a result, the optical image of the subject is formed at a position of the display device 35. Further, each light of the optical image and the image P passes through the downstream lens 32b and is guided to the eyepiece window 33. As a result, the display mechanism 34 displays the image P on the display device 35 such that the user can observe the image P together with the optical image.

Figure 4:
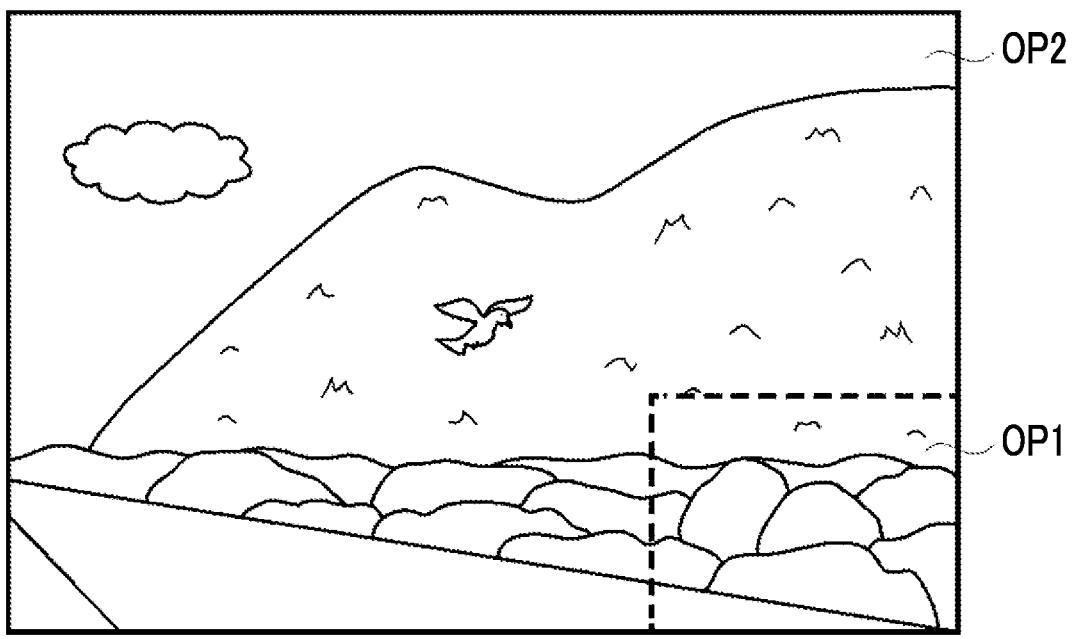
FIG. 4 is an explanatory diagram of the optical image to be observed through the observation apparatus.

An image (internal visual field in the finder) that is observable through the observation apparatus 30 will be described in detail with reference to FIGS. 3 and 4. As shown in FIG. 4, the optical image that is observable through the observation apparatus 30 has a first optical region OP1 and a second optical region OP2. As shown in FIG. 3, the display mechanism 34 superimposes the image P on the first optical region OP1 to display the image P. In other words, the first optical region OP1 corresponds to a region on which the image P is superimposed in the optical image. The second optical region OP2 is a region on which the image P is not superimposed in the optical image, that is, a region other than the first optical region OP1. By allowing the light in each region of the optical image to transmit through the display device 35, the user can observe both the optical image of the first optical region OP1 and the image P.

A region of the display device 35 through which the light of the first optical region OP1 passes corresponds to the first optical region OP1, and is hereinafter referred to as a first display region 35a. That is, the control unit 40 displays the image P in the first display region 35a. In addition, a region of the display device 35 through which the light of the second optical region OP2 passes corresponds to the second optical region OP2, and is hereinafter referred to as a second display region 35*b*.

With the above configuration, the user can observe both the image and the optical image by peeping into the inside of the observation apparatus 30 through the eyepiece window 33. In this case, the control unit 40 displays setting information EI including exposure conditions such as the F-number, the shutter speed, and the ISO sensitivity on the display device 35 together with the image P (see FIG. 3). The setting information EI is displayed by being superimposed on the optical image at a position distant from the image P.

In addition, the control unit 40 displays a marker F indicating an imaging range (angle of view) of the imaging element 20 on the display device 35 (see FIG. 3). The marker F is displayed by being superimposed on the optical image and is, for example, a frame surrounding a region corresponding to the angle of view in the optical image, an L-shaped mark indicating a boundary position of the region, or the like. The control unit 40 specifies a positional relationship between the optical image of the subject and the angle of view based on the specifications of the imaging lens 12 and information regarding each part of the observation apparatus 30 and displays the marker F on the display device 35 according to the specified positional relationship.

Figure 10:
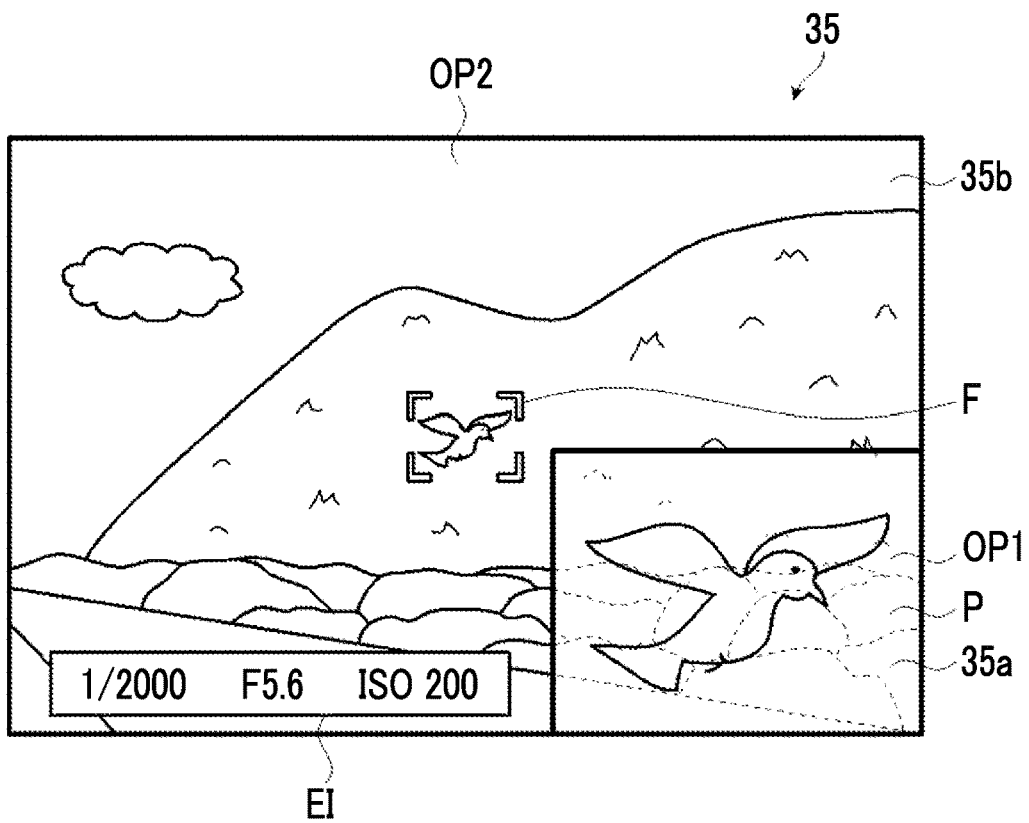
FIG. 10 is a diagram showing the image in a case where a display size is changed and the optical image.
Figure 11:
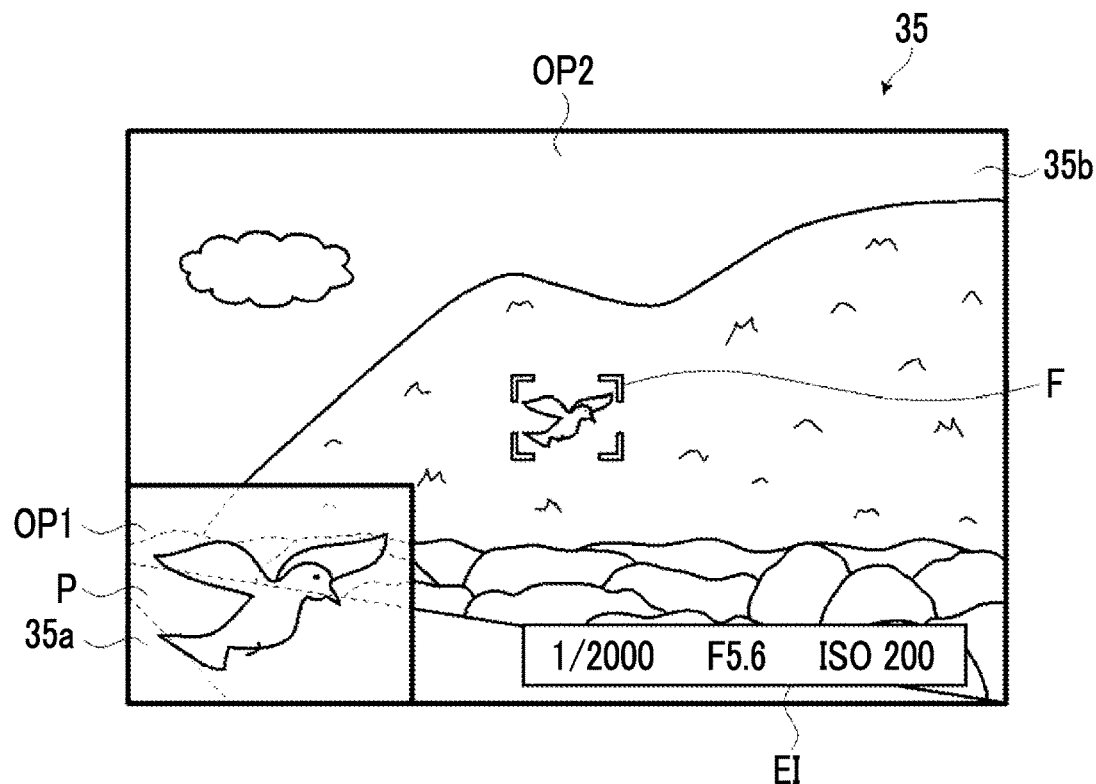
FIG. 11 is a diagram showing the image in a case where a display position is changed and the optical image.

Further, the display size and the display position in a case where the image P is displayed on the display device 35 are variable as shown in FIGS. 10 and 11. For example, the control unit 40 sets, for example, in a case of receiving an input operation of the user, the display size and the display position of the image based on the operation content and changes, in a case of receiving a change instruction of the user, the display size or the display position according to the instruction content.

In addition, the control unit 40 decides the display position of the setting information EI such that the display region of the image P does not overlap the display region of the setting information EI in the display mechanism 34 (specifically, the display device 35), in accordance with the setting or the change of the display size and the display position of the image P. As a result, since the image P is displayed without interfering with the setting information EI, the user can appropriately observe the image P, that is, the subject within the angle of view.

Figure 12:
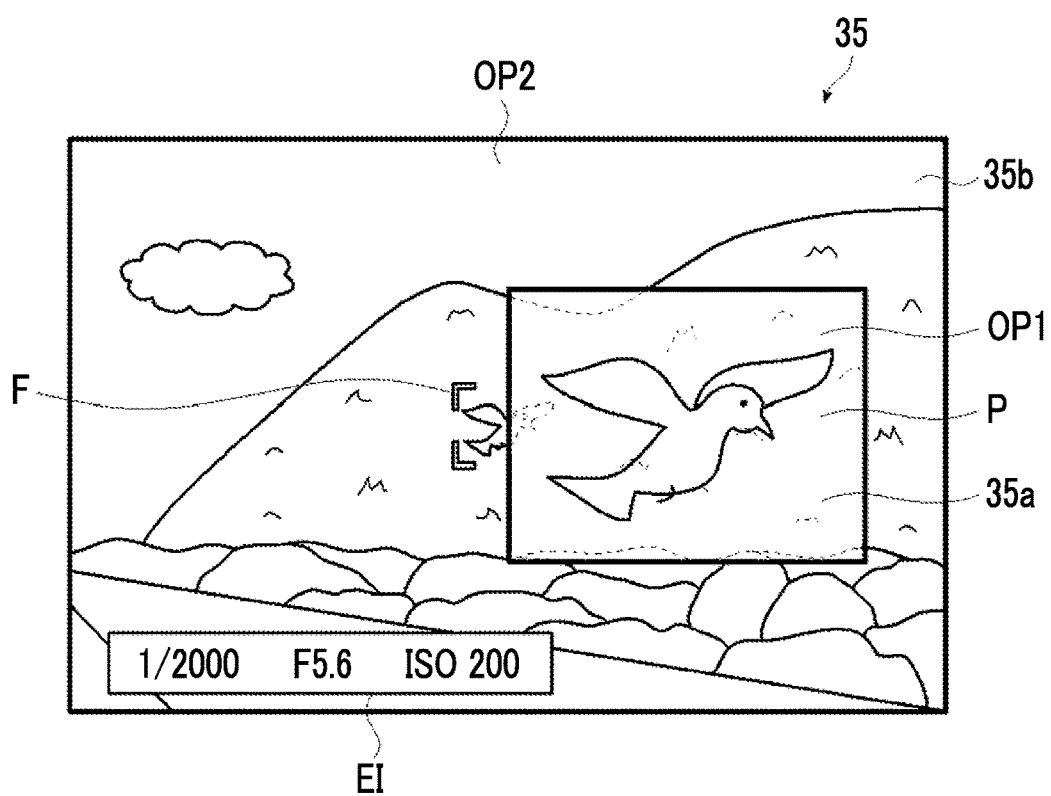
FIG. 12 is a diagram showing the image in a case where a display region of the image and a display region of a marker overlap each other and the optical image.

Further, there may be a case where, depending on the display size and the display position of the image P, an overlapping region where the display region of the image P and the display region of the marker F overlap each other in the display mechanism 34 is present (specifically, the display device 35). In this case, as shown in FIG. 12, the control unit 40 preferentially displays, out of the marker F and the image, one over the other in the overlapping region on the display device 35. "Preferentially display" means displaying, on the pixels of the display device 35, for example, in a case where the display regions of the marker F and of the image P overlap in the display device 35, out of the marker F and the image P, one to be preferentially displayed. In the case shown in FIG. 12, the image P is preferentially displayed over the marker F in the overlapping region.

With the above configuration, in the overlapping region, out of the marker F and the image P, an image that is more important to the user can be preferentially displayed, whereby it is possible to appropriately support the imaging behavior of the user. It is preferable that which of the marker F and the image P is preferentially displayed can be selected by the user from the viewpoint of making the above effect more effective. However, the present invention is not limited to this, and out of the marker F and the image P, one selected by the control unit 40 in accordance with a predetermined rule may be preferentially displayed.

Meanwhile, in a case where the observation apparatus 30 is used in a situation where the intensity of the ambient light is high, the optical image appears bright. Therefore, in a case where the optical image having the brightness is transmitted through the display device 35, the visibility of the image P superimposed on the first optical region OP1 decreases.

Figure 13:
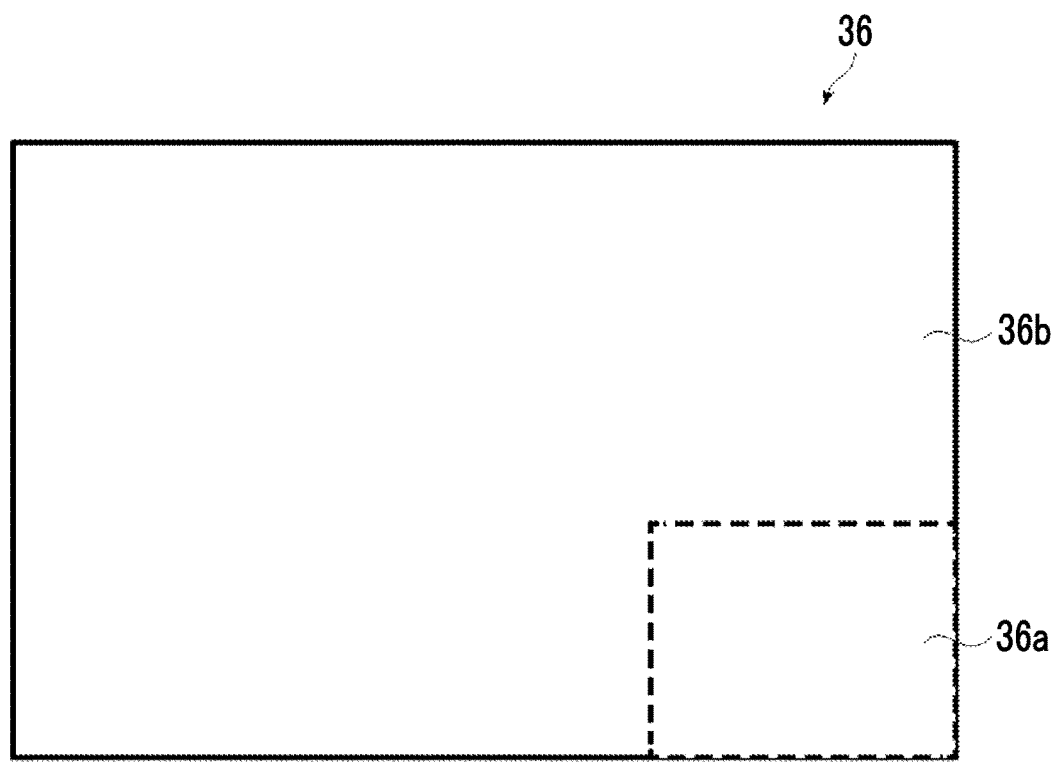
FIG. 13 is an explanatory diagram related to a case where the observation apparatus is used under a situation where an intensity of ambient light is high, in which an upper figure shows each light shielding region of the light shielding mechanism, and the lower figure shows an optical image and an image that are observable in the observation apparatus.
Figure 13:
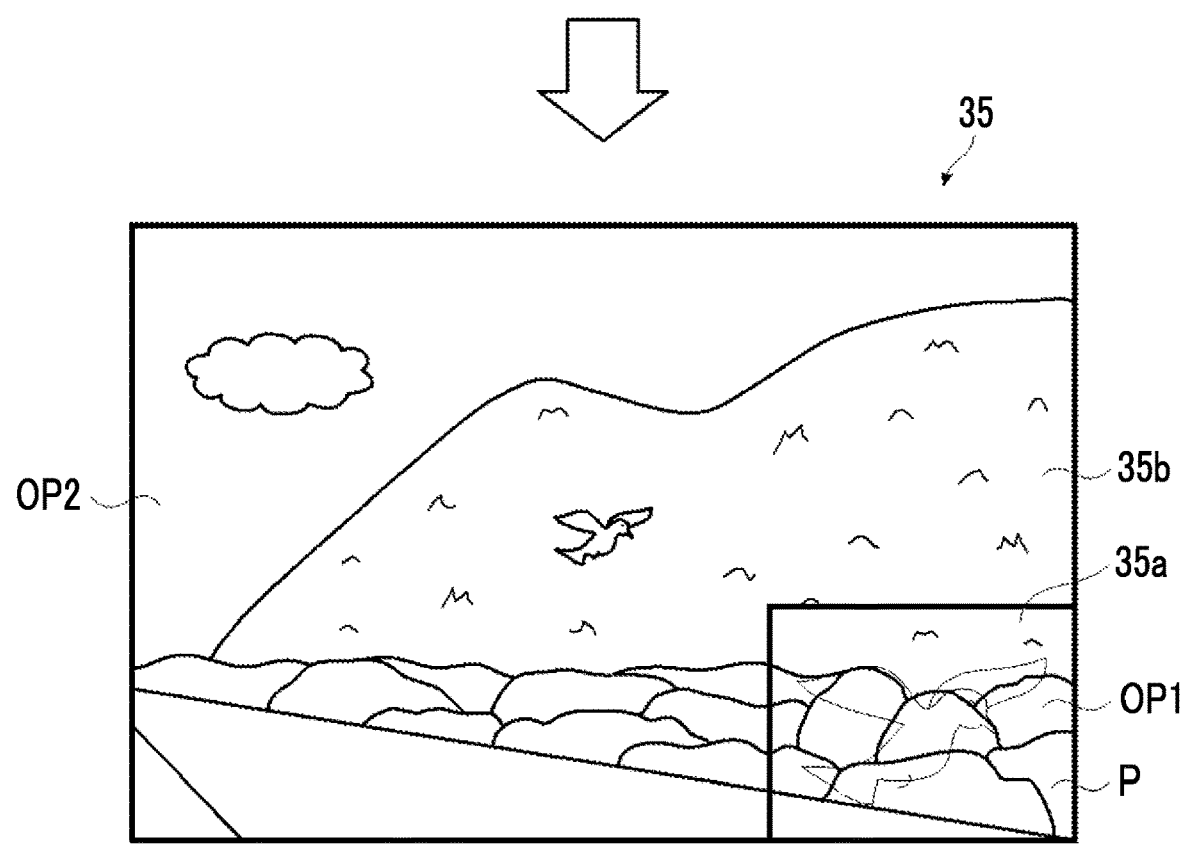

More specifically, it is assumed that, for the purpose of enabling the observation of the optical image in a case where the observation apparatus 30 is used under an imaging environment where the intensity of the ambient light is high, as shown in the upper figure of FIG. 13, the light shielding rate of the entire light shielding mechanism 36 is controlled to a low value. In this case, as shown in the lower figure of FIG. 13, the subject of the image P displayed by being superimposed on the first optical region OP1 is difficult to see because of the brightness of the first optical region OP1. In addition, since the first optical region OP1 appears transparent through the image P, the visibility of the image further decreases.

Figure 14:
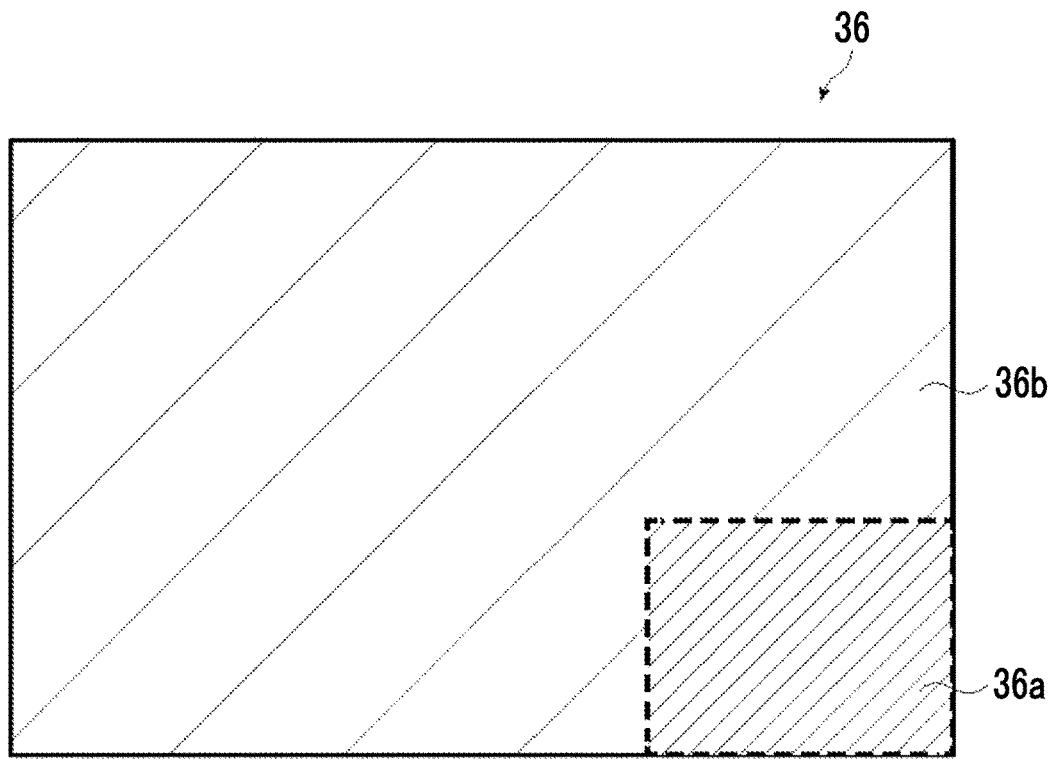
FIG. 14 is an explanatory diagram of an effect in a case where the light shielding rate of each light shielding region of the light shielding mechanism is controlled, in which the upper figure shows each light shielding region of the light shielding mechanism, and the lower figure shows an optical image and an image that are observable in the observation apparatus.
Figure 14:
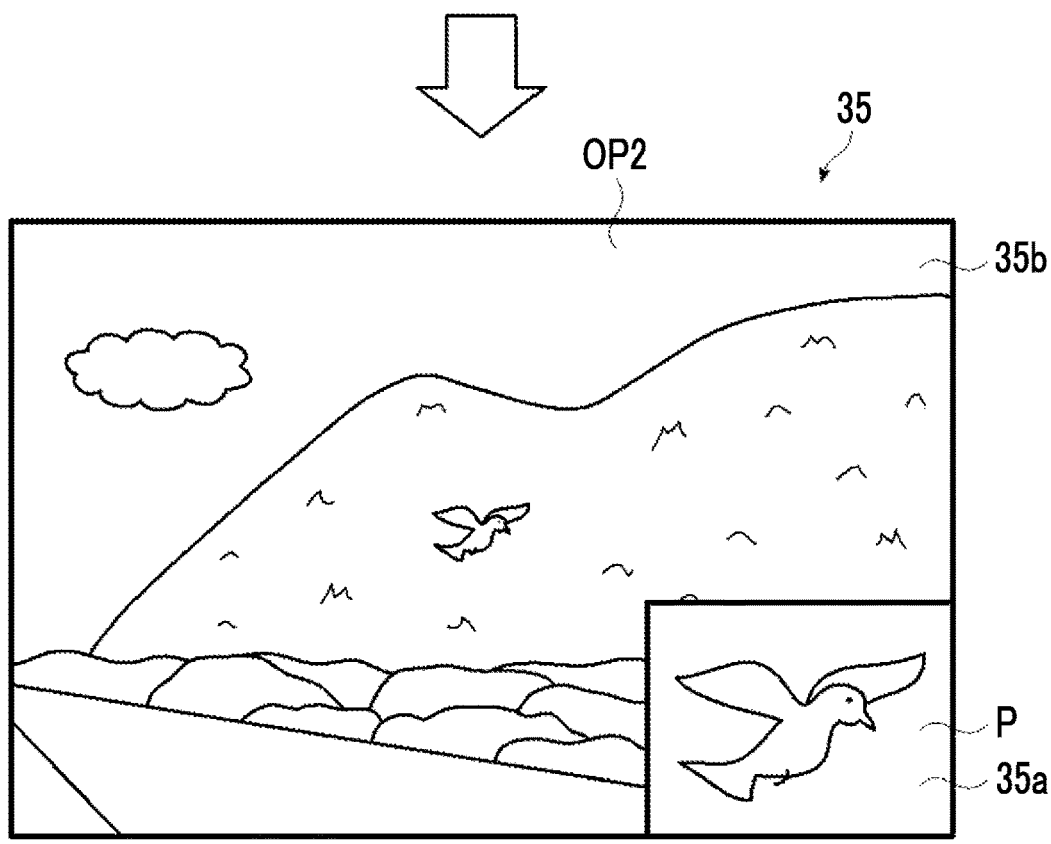
Figure 16:
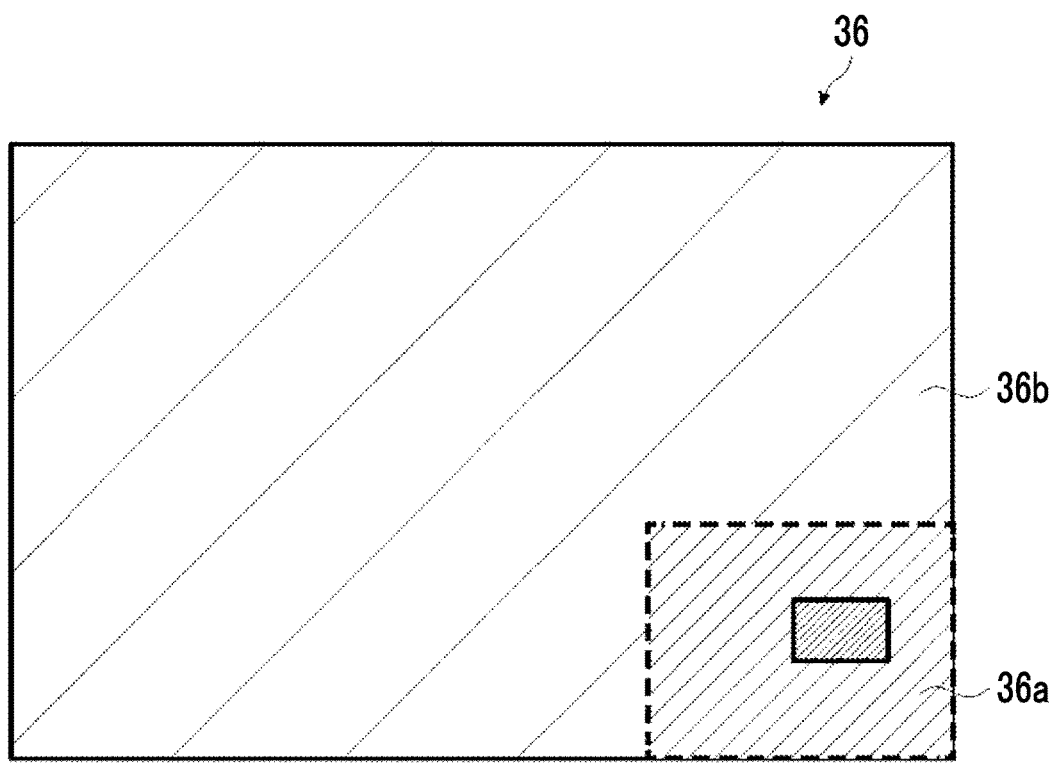
FIG. 16 is an explanatory diagram of an effect in a case where a light shielding rate of a light shielding region overlapping an image of an in-focus region is made higher, in which the upper figure shows each light shielding region of the light shielding mechanism, and the lower figure shows an optical image and an image that are observable in the observation apparatus.
Figure 16:
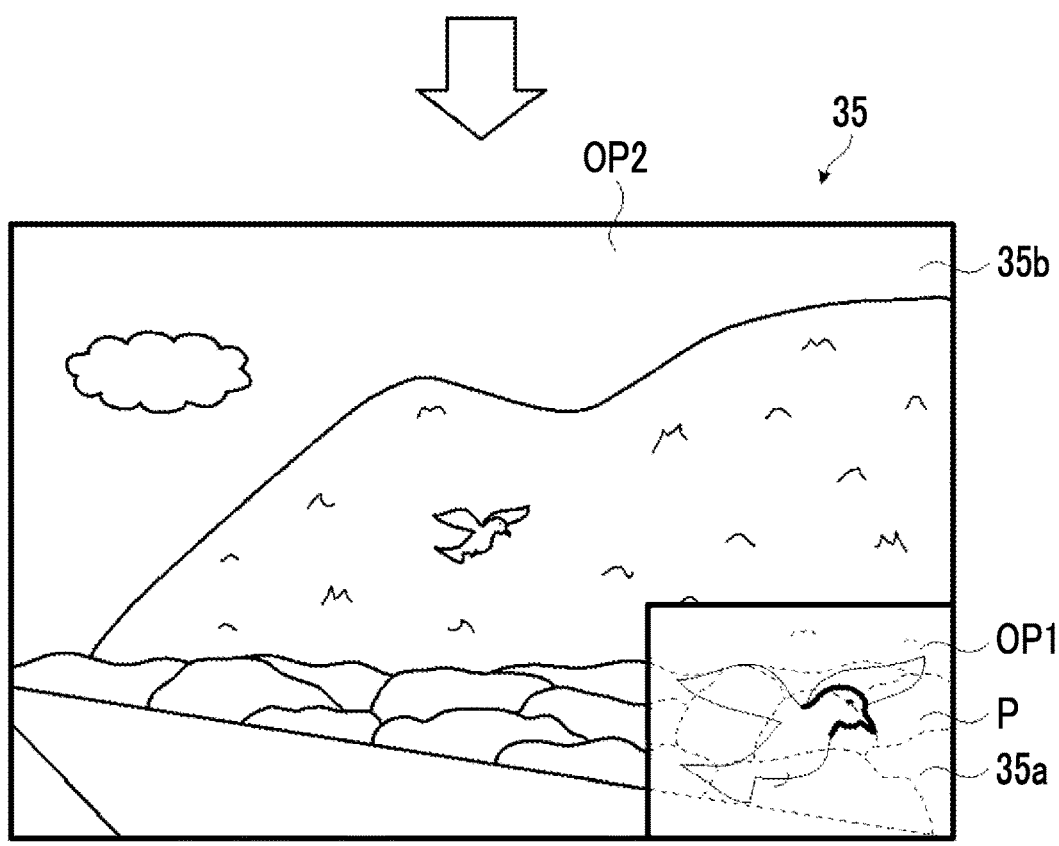

In FIGS. 13, 14, and 16, for convenience of illustration, the setting information EI and the marker F are not shown.

As a method for improving the visibility of the image P under an imaging environment in which the intensity of the ambient light is high, it is conceivable to increase the level of brightness of the display device 35 in the display region of the image P. However, since the adjustment range of the level of brightness of the display device 35 differs depending on the specifications of the display device 35, there is a limit to the countermeasures by the above method. Further, as described in JP2015-232665A, a method of suppressing the brightness of the optical image by adjusting the amount of light through the lens stop drive is also conceivable, but this method also may affect the brightness of the display image. In addition, in adjusting the amount of light through the lens stop drive, the brightness of both the image and the optical image is changed at the same time, so that it is difficult to adjust the balance of the brightness of both.

In that respect, in the first embodiment, the control unit 40 controls the light shielding rate of each of the plurality of regions in the light shielding mechanism 36 based on the intensity of the ambient light. Specifically, the control unit 40 executes the detection processing of detecting the intensity of the ambient light and executes the control processing with respect to the light shielding mechanism 36 according to the detection result.

In the detection processing, the control unit 40 detects the intensity of the ambient light based on the output signal of the sensor 48 and the signal (image signal) generated by the imaging element 20. In the control processing, the control unit 40 controls the light shielding rate of each of a first light shielding region 36*a* and a second light shielding region 36*b* in the light shielding mechanism 36 based on the detected intensity of the ambient light.

The first light shielding region 36*a* is a region of the light shielding mechanism 36, which is superimposed on the first optical region OP1, and is present at a position where the light of the first optical region OP1 passes through the optical path of the incidence light entering the observation apparatus 30. In the present embodiment, the first light shielding region 36*a* is located on the upstream side of the display device 35 at a position where the first light shielding region 36a overlaps the first display region 35a, that is, at a position where light transmitted through the first display region 35a is shielded.

The second light shielding region 36b is a region of the light shielding mechanism 36, which is superimposed on the second optical region OP2, and is present at a position where the light of the second optical region OP2 passes through the optical path of the incidence light entering the observation apparatus 30. In the present embodiment, the second light shielding region 36b is located on the upstream side of the display device 35 at a position where the second light shielding region 36b overlaps the second display region 35b, that is, at a position where light transmitted through the second display region 35b is shielded.

In the control processing, by controlling the light shielding rate of each light shielding region in the light shielding mechanism 36 based on the intensity of the ambient light, the visibility of the optical image and of the image to be observed through the observation apparatus 30 can be improved in consideration of the intensity of the ambient light.

In addition, since the light shielding rates of the first light shielding region 36a and of the second light shielding region 36b in the light shielding mechanism 36 are individually controlled, the visibility (brightness) of the optical image and of the image can be adjusted independently of each other. As a result, in the present embodiment, the visibility of the optical image and of the image can be more appropriately adjusted as compared with the invention described in JP2015-232665A in which the amount of light is adjusted through the lens stop drive.

That is, in the lens stop drive, the brightness of each of the image and the optical image cannot be individually controlled, and it is difficult to adjust the balance between the two. On the other hand, in the present embodiment, the light shielding rate of each of the first light shielding region 36a and the second light shielding region 36b can be individually controlled. That is, the brightness of each of the image and the optical image can be individually adjusted. A specific case will be described. As shown in the upper figure of FIG. 14, the light shielding mechanism 36 makes the light shielding rate of the first light shielding region 36a sufficiently higher than that of the second light shielding region 36b (for example, the light shielding rate is set to be 100%). As a result, as shown in the lower figure of FIG. 14, the visibility of the image P can be improved while maintaining the brightness of the optical image even in a case where the intensity of the ambient light is very strong. In a case where both the first optical region OP1 and the image P are desired to be visually recognized by the user in the first display region 35a, the light shielding rate need only be set to, for example, about 50% to 90%.

The light shielding rate control in the control processing will be described in detail. In the control processing, the light shielding rate of the second light shielding region 36b is adjusted based on the output signal of the sensor 48. This is because the second light shielding region 36b is superimposed on the second optical region OP2, and the second optical region OP2 may be displayed with brightness corresponding to the amount of incidence light entering the observation apparatus 30. That is, by detecting the intensity of the ambient light from the output signal of the sensor 48 and controlling the light shielding rate of the second light shielding region 36b based on the detection result, it is possible to appropriately control the light shielding rate such that the visibility of the second optical region OP2 is improved.

Meanwhile, in the control processing, the light shielding rate of the first light shielding region 36a is controlled based on the output signal of the sensor 48 and the signal (image signal) generated by the imaging element 20. This is to consider the balance of brightness between the optical image and the image P.

More specifically, the brightness of the image P is decided according to the intensity of the subject (inside the marker F in FIG. 3) within the imaging angle of view. Then, the intensity thereof is detected based on the signal generated by the imaging element 20, strictly speaking, an integrated value of an exposure amount obtained from the signal. On the other hand, the brightness of the optical image is decided according to the amount of incidence light entering the observation apparatus 30, that is, the intensity of light in the entire imaging environment including the angle of view of the observation apparatus 30, and is detected based on the output signal of the sensor 48. That is, since the measurement range is different between the brightness of the image P (the brightness at the imaging angle of view) and the brightness of the optical image (brightness at the angle of view of the observation apparatus 30), there may be a case where the intensity of the ambient light at the imaging angle of view and the intensity of light at the entire angle of view of the observation apparatus 30 are different from each other.

In view of the above points, in the present embodiment, the light shielding rate of the first light shielding region 36a is controlled based on the output signal of the sensor 48 and the signal generated by the imaging element 20. As a result, it is possible to balance the brightness between the optical image and the image P and to clearly display, for example, the image P with respect to the optical image in the first display region 35a.

It is preferable that the first light shielding region 36a of the light shielding mechanism 36 is configured to cover the entire first display region 35a on the upstream side (subject side) of the display device 35 to sufficiently shield the light transmitted through the first display region 35a. Therefore, the area of the first light shielding region 36a (the area when the light shielding mechanism 36 is viewed from the front) need only be the same as or equal to or more than the area of the first display region 35a (the area when the display device 35 is viewed from the front). In addition, since the light shielding mechanism 36 is disposed on the upstream side of the display device 35, the light shielding rate of the light shielding mechanism 36 is increased, so that the amount of light incident on the display device 35 can be reduced and deterioration of the display device 35 can be suppressed.

In particular, in a case of considering stray (leakage) of light from the edge of the first light shielding region 36a, it is more preferable that the area of the first light shielding region 36a is slightly larger than the area of the first display region 35a. In other words, in a case where the first light shielding region 36a and the first display region 35a are viewed in an overlapping manner, the end part of the first light shielding region 36a is suitably located outward of the end part of the first display region 35a. Here, "outward" means the outside when the center position (that is, the central position of the first display region 35a) of the image P displayed in the first display region 35a is set as a reference, that is, the side far from the center position.

Figure 15:
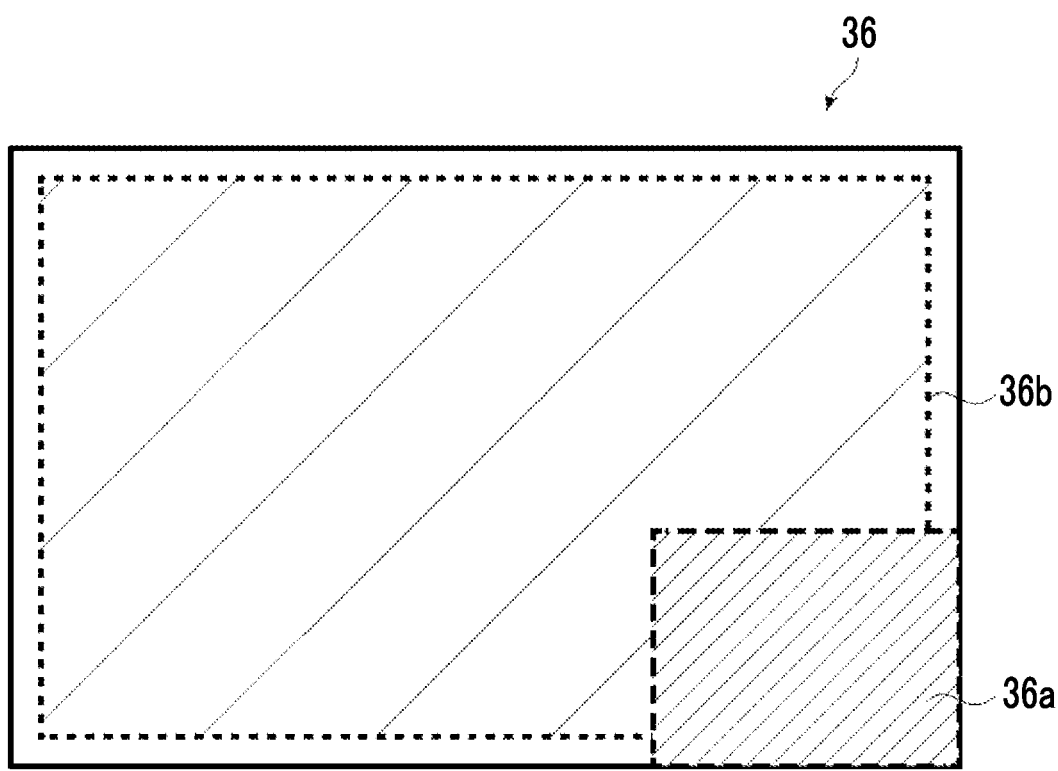
FIG. 15 is an explanatory diagram of a light shielding rate of a second light shielding region.

In addition, most of the optical image is observed by being transmitted through the second display region 35b of the display device 35, and the brightness thereof is decided according to the light shielding rate of the second light shielding region 36b. Here, due to the nature of the optical image, the brightness of the end part region of the optical image tends to be lower than the brightness of the central region. In view of the above points, in the control processing, as shown in FIG. 15, the light shielding rate of the end part region of the second light shielding region 36b need only be controlled to be lower than the light shielding rate of the central region of the second light shielding region 36b.

In addition, after executing the control processing, the user may manually change the light shielding rate of each light shielding region in the light shielding mechanism 36. That is, after the control unit 40 controls the light shielding rate of each of the first light shielding region 36a and the second light shielding region 36b based on the detected intensity of the ambient light, the control unit 40 may re-control the light shielding rate of each light shielding region in response to an input operation of the user.

In addition, the control unit 40 may execute the control processing such that the image of the in-focus region is more clearly displayed in the image to be displayed in the first display region 35a. Specifically, as shown in the upper figure of FIG. 16, the light shielding rate of a region of the first light shielding region 36a (region surrounded by a solid line in the upper figure of FIG. 16), which overlaps the image of the in-focus region, may be controlled to be higher than the light shielding rate of a region that overlaps the image of the out-of-focus region. In this case, in the first light shielding region 36a, the light shielding rate of the region overlapping the image of the in-focus region may be increased, or the light shielding rate of the region overlapping the image of the out-of-focus region may be decreased. As a result, as shown in the lower figure of FIG. 16, in the image displayed in the first display region 35a, the image of the in-focus region appears conspicuous.

The method of displaying the image of the in-focus region in a conspicuous manner is not limited to the control of the light shielding rate described above, and other methods are also conceivable. For example, the display format of the image of the in-focus region may be changed to a format different from the display format of the image of the out-of-focus region. Here, the display format of the image refers to the level of brightness in a case where the image is displayed, whether or not there is a change in hue, whether or not blinking display or highlight display is performed, and whether or not an instruction object such as a pointer or a cursor is displayed, and the like. By changing the display format of the image of the in-focus region to a format different from the display format of the image of the out-of-focus region, the image of the in-focus region can be made more conspicuous in the image P.

Figure 17:
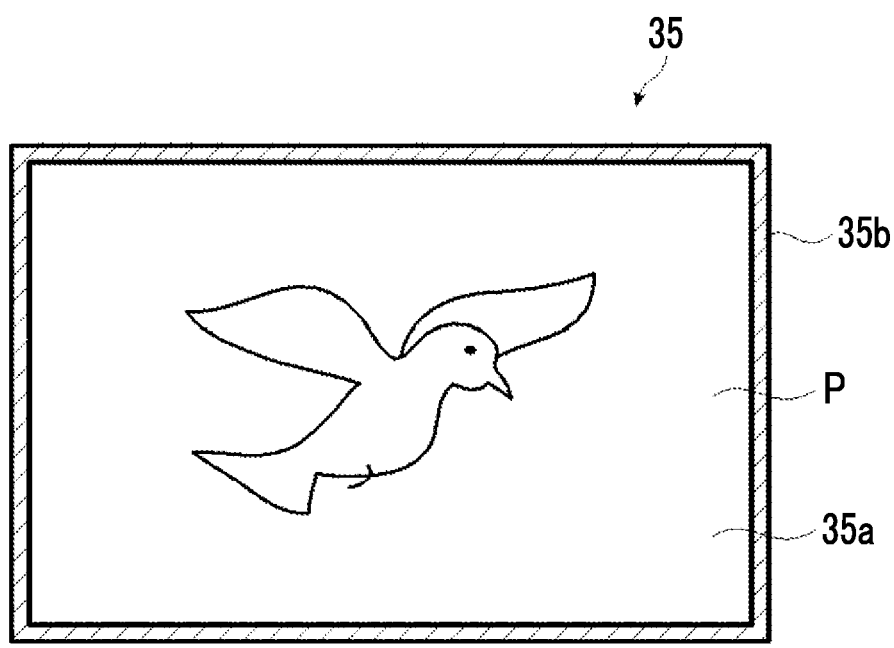
FIG. 17 is a diagram showing an image that is observable in the observation apparatus in a case where an imaging environment is a dark environment.

In addition, there may be a case where the intensity of the ambient light detected by the detection processing is lower than the reference value, for example, the imaging environment is a dark environment such as an outdoor space at night. The reference value is, for example, a value corresponding to the intensity of ambient light in a case where the imaging environment is a dark environment. In a case where the intensity of the ambient light is lower than the reference value, the control unit 40 may increase the light shielding rate of each of the first light shielding region 36a and the second light shielding region 36b and control the intensity, for example, to a value near the upper limit value. This is because, in a case where the imaging environment is a dark environment, it is less necessary to confirm the optical image of the subject. That is, during a period in which the imaging environment is a dark environment, the light shielding rate of each of the light shielding region of the light shielding mechanism 36 need only be increased to shield the light from the subject, and the angle of view of the image P to be displayed on the display mechanism 34 need only be enlarged as shown in FIG. 17. As a result, the user can concentrate on confirming the image P without looking at the optical image.

In a case where the intensity of the ambient light is lower than the reference value, a message or a voice to the user suggesting to increase the light shielding rate of each light shielding region may be output instead of increasing the light shielding rate of each light shielding region of the light shielding mechanism 36 as described above. In this case, the user need only perform an operation of responding to the output message or voice, and the control unit 40 need only increase the light shielding rate of each light shielding region at a point in time when the response operation is received.

Regarding Operations of Imaging Apparatus and of Observation Apparatus in First Embodiment Next, the operations of the imaging apparatus 10 and of the observation apparatus 30 in the first embodiment, particularly the flow of operations (operation flow) related to the use of the observation apparatus 30, will be described with reference to FIG. 18.

In a case where the power of the imaging apparatus 10 is turned on, imaging is started, and generation of the image (specifically, the live view image) based on the output signal of the imaging element 20 is started (S001). At the same time as the start of the imaging or after the start of the imaging, the adjustment of the focusing position is performed by the autofocus function as appropriate (S002). Note that step S002 is an optional process and can be omitted.

After that, in a case where the user requests the use of the observation apparatus 30 through the operation unit 24, or in a case where the distance between the user and the observation apparatus 30 measured by a distance-measuring sensor (not shown) is equal to or less than a threshold value, the control unit 40 executes processing after step S003. Specifically, the control unit 40 executes the detection processing and detects the intensity of the ambient light based on the signal generated by the imaging element 20 and the output signal of the sensor 48 (S003).

In addition, the control unit 40 determines whether or not the additional correction with respect to the output value of the image is necessary based on the image data created during the imaging (S004). Then, in a case where the additional correction is necessary, the control unit 40 corrects the output value with a correction amount corresponding to the intensity detected in step S003 (S005). In a case where the additional correction is not necessary, step S005 is omitted.

The display image data is created through the steps up to the above (S006), and the control unit 40 causes the display device 35 provided in the display mechanism 34 to display the image P indicated by the display image data (S007). In the display device 35, the display region of the image P, that is, the first display region 35a, is located at a position of initial setting or at a position set in advance by the user.

In addition, in a case where the additional correction is performed in step S005, the image P is displayed in the first display region 35a based on the corrected gradation value (specifically, the output value). In addition, the control unit 40 displays the setting information EI related to the exposure condition and the like and the marker F indicating the angle of view on the display device 35 together with the image P (see FIG. 3).

Further, during imaging, light from the subject is incident into the observation apparatus 30, and the optical image formed by the optical system 32 passes through the display device 35. By peeping into the observation apparatus 30, the user observes both the image P displayed in the first display region 35a and the optical image transmitted through the display device 35.

Meanwhile, the control unit 40 executes the control processing and controls the light shielding rate of each of the plurality of light shielding regions in the light shielding mechanism 36 based on the intensity of the ambient light detected by the detection processing (S008). In the control processing, the light shielding rate of the first light shielding region 36a is controlled based on the output signal of the sensor 48 and the signal generated by the imaging element 20, and the light shielding rate of the second light shielding region 36b is adjusted based on the output signal of the sensor 48.

Figure 18:
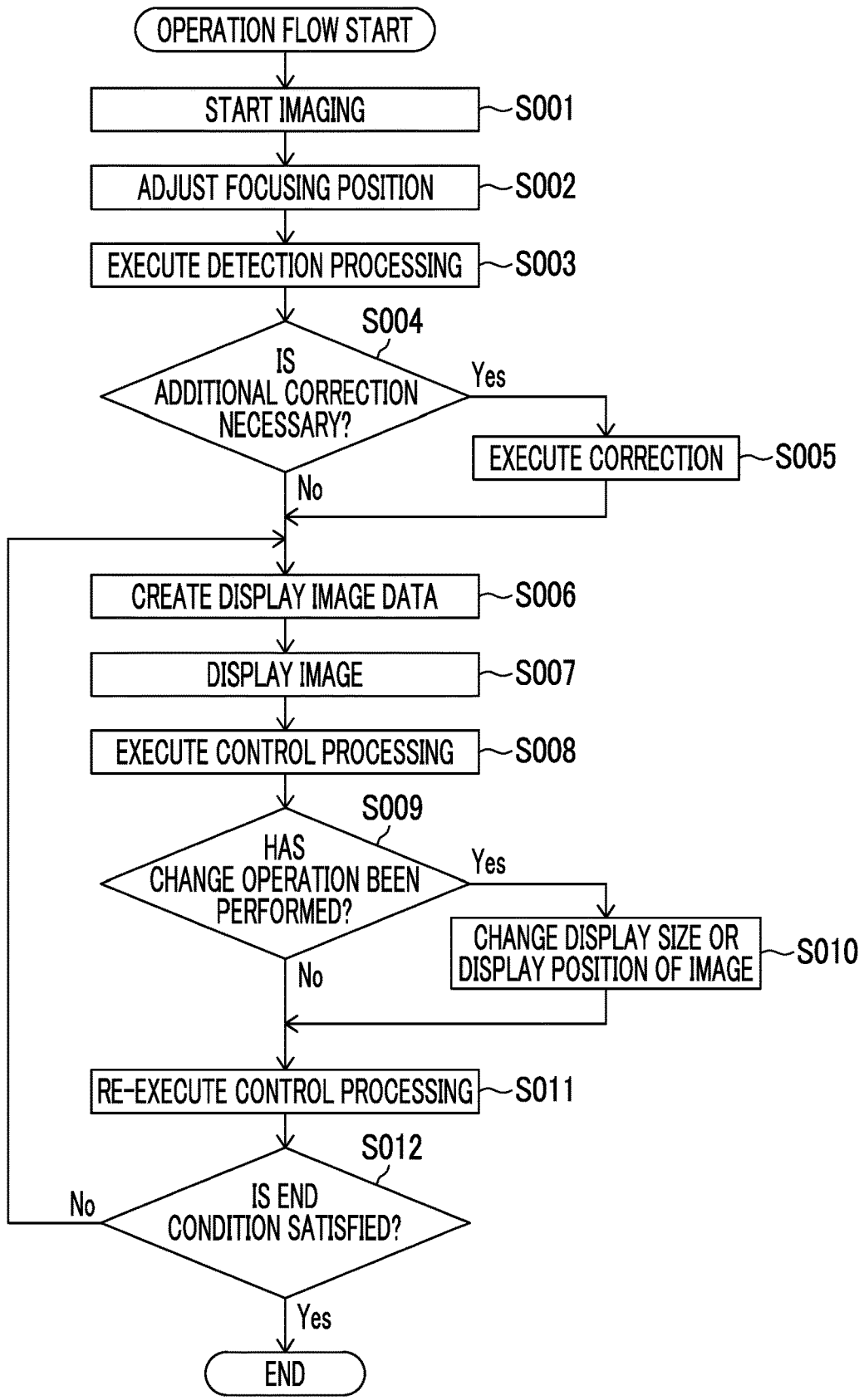
FIG. 18 is a diagram showing an operation flow of the imaging apparatus and the observation apparatus according to one embodiment of the present invention.

In FIG. 18, the control processing is executed after image display, but the control processing may be executed at the same time as the timing of displaying the image on the display device 35 or may be executed before the image display.

There may be a case where, after the image display, the user performs an operation of changing the display size or the display position of the image P (hereinafter, a change operation) (S009). In this case, the control unit 40 receives the change operation and changes the display size or the display position of the first display region 35a on which the image P is displayed according to the content of the change operation (S010). In addition, the control unit 40 executes the control processing again with the change of the first display region 35a (S011). In the control processing again, the light shielding rate of each of a region that is superimposed on the changed first display region 35a to newly become the first light shielding region 36a and a region that is superimposed on the changed second display region 35b to newly become the second light shielding region 36b is controlled.

Although not particularly shown in FIG. 18, there may be a case where the first display region 35a and the display region of the marker F overlap each other in the display device 35 because of the change in the display size or the display position of the first display region 35a. In this case, the control unit 40 need only preferentially display, out of the image P and the marker F, one over the other in the overlapping region where the first display region 35a and the display region of the marker F overlap each other (see FIG. 12).

Through the series of steps up to the above, the user can use the observation apparatus 30. Then, the use of the observation apparatus 30 ends at a point in time (S012) in which a predetermined end condition is satisfied, for example, the power of the imaging apparatus 10 is turned off.

Second Embodiment

In the first embodiment, in the control processing, the control unit 40 controls the light shielding rate of each of the plurality of light shielding regions in the light shielding mechanism 36 based on the intensity of the ambient light. However, other aspects for controlling the light shielding rate of each light shielding region are conceivable, and an example thereof will be described below as a second embodiment.

In the following, the differences between the second embodiment and the first embodiment will be mainly described, and the common points with the first embodiment will be omitted.

In the second embodiment, the light shielding rate of each light shielding region is controlled to reflect the intention of the user. That is, in the second embodiment, the user directly or indirectly designates the light shielding rate of each light shielding region, and in the control processing, the light shielding rate of each light shielding region is controlled to be the light shielding rate designated by the user.

The control processing according to the second embodiment will be described with reference to a specific example. For example, it is assumed that, for the image display on the observation apparatus 30, a plurality of modes can be selected and the user designates any one of the modes. In this case, the control unit 40 displays a mode designation screen shown in FIG. 19 on the rear display 22 or the display mechanism 34. The user performs an input operation to designate a mode through the mode designation screen. The input operation in this case is performed, for example, via a command dial, the select button 26, or the touch panel 27 provided in the imaging apparatus 10. In addition, these input operations may be performed, for example, through a command dial, a select button, or a touch panel provided in the observation apparatus 30.

Figures 19, 20:
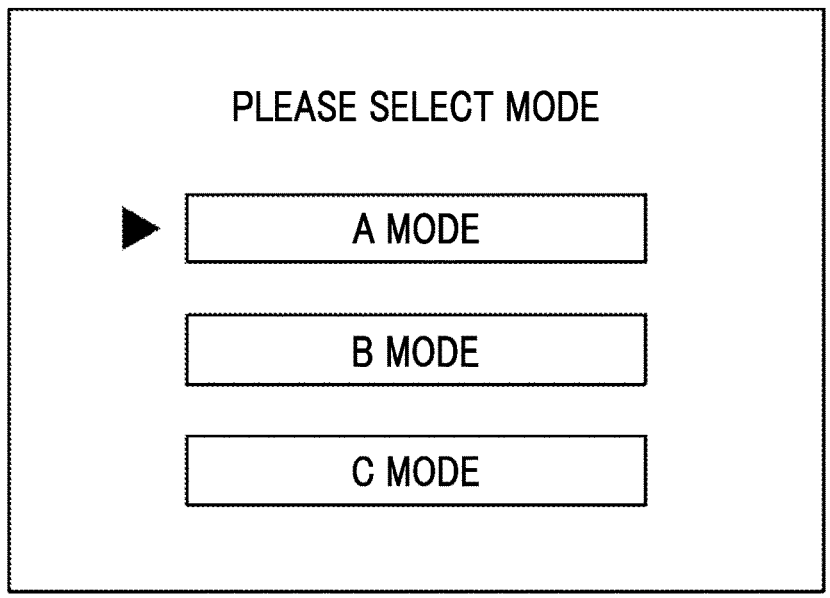
FIG. 19 is a diagram showing a mode designation screen.
FIG. 20 is an explanatory diagram of a display size of the image and a light shielding rate of each light shielding region of the light shielding mechanism, which are set for each mode.

In the mode designation screen shown in FIG. 19, "mode A", "mode B", and "mode C" can be designated as an example of the plurality of modes, but the number of types of modes that can be designated, the content of each mode, and the like are not particularly limited.

Each of the plurality of modes is associated with the display size of the image P in the display mechanism 34 (display size of the image P in the display device 35) and the light shielding rates corresponding to the plurality of light shielding regions in the light shielding mechanism 36. More specifically, the display size of the image and the light shielding rate of each light shielding region are set for each mode. As shown in FIG. 20, each of these set values is stored in the storage device such as the internal memory 50, the memory card 52, or the external server in a state of being associated with any one of the plurality of modes.

In a case where the user designates any one mode in the input operation, the control unit 40 receives the input operation and executes the control processing according to the content of the input operation. In the control processing according to the second embodiment, the control unit 40 controls the light shielding rate of each light shielding region and also controls the display size of the image P in the display mechanism 34.

In the control processing, first, the control unit 40 reads out the display size and the light shielding rate of each light shielding region in response to the input operation of the user from the storage device. Specifically, the display size and the light shielding rate of each light shielding region are read out based on the mode designated by the user. Then, the control unit 40 controls the display size of the image P and the light shielding rate of each light shielding region in accordance with the respective read-out values.

As described above, in the second embodiment, it is possible to control the light shielding rate of each light shielding region while reflecting the intention of the user. In addition, regarding the control of the light shielding rate of each light shielding region, the user only needs to designate any one of the plurality of modes, which improves the usability for the user (the effort for directly inputting the light shielding rate can be eliminated).

Further, in the second embodiment, since the light shielding rate of each light shielding region is read out together with the display size of the image P and control is performed using these values as a set, efficient control is realized as compared with a case of performing control by individually designating these values. However, the present invention is not limited to this, and the control of the display size of the image P and the control of the light shielding rate of each light shielding region may be individually performed.

In addition, in the second embodiment as well, as in the first embodiment, the light shielding rate of each light shielding region may be adjusted based on the intensity of the ambient light. In this case, the control unit 40 need only read out, from the storage device, the light shielding rate of each light shielding region in response to the input operation of the user, correct the read-out light shielding rate based on the intensity of the ambient light, and control the light shielding rate of each light shielding region to be the corrected light shielding rate.

Third Embodiment

As shown in FIG. 2, the optical system 32 is disposed in the observation apparatus 30, and the optical system 32 includes the lens 32a. In a case where the lens 32a is a lens that causes distortion such as a fisheye lens, the optical image and the image that have a wide angle of view but are observed through the lens may appear distorted. It is permissible for the optical image to appear distorted, but for the image, it is necessary to correct the distortion for the reason of confirming the recorded image. An embodiment in which the image is displayed in consideration of the distortion of the lens in the observation apparatus 30 will be described below as a third embodiment.

In the following, the differences between the third embodiment and the first embodiment will be mainly described, and the common points with the first embodiment will be omitted.

Figure 21:
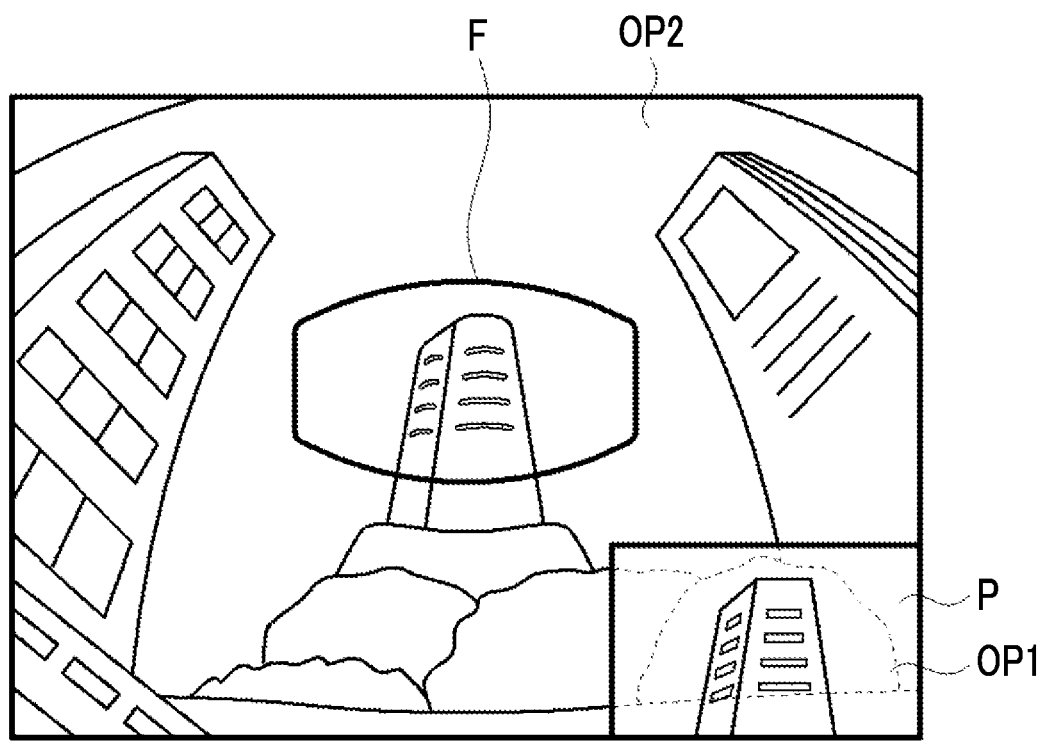
FIG. 21 is a diagram showing an optical image to be observed in a state in which distortion has occurred, a corrected image, and an uncorrected marker.

In the third embodiment, since the optical image passes through the lens 32a, the optical image appears distorted as shown in FIG. 21 because of the distortion by the lens 32a. Since the image P displayed by being superimposed on the optical image passes through the lens 32a, the image P may appear distorted in a state as it is because of distortion as in the optical image. In that respect, the control unit 40 (strictly speaking, the correction section 47) performs correction on the image P corresponding to the distortion.

Specifically, the control unit 40 reads out information regarding the distortion of the lens 32a from the internal memory 50 or the like and performs known correction for aberration reduction on the image data based on the information to create the display image data. The corrected image P displayed by the created display image data appears as viewed through the lens 32a, but is observed in a state in which the distortion due to the aberration is reduced as shown in FIG. 21.

The correction for aberration reduction is not limited to the configuration in which the correction for aberration reduction is performed by the control unit 40, and for example, in a module provided in the display device 35, the correction for aberration reduction may be performed by a control circuit in the module.

In the third embodiment, as shown in FIG. 21, the marker F consisting of a frame surrounding the imaging range (angle of view) of the imaging element 20 is superimposed on the optical image together with the image P and is displayed on the display device 35 of the display mechanism 34. The marker F is observed through the lens 32a and originally has a rectangular shape in a case where distortion due to the lens 32a does not occur. Meanwhile, since the marker F indicates the position of the angle of view in the optical image, the marker F also needs to be observed in a state in which the distortion has occurred (to appear distorted) in a case where the optical image is observed in a state in which the distortion has occurred.

Therefore, the control unit 40 reads out information regarding the optical system 32 including the lens 32a and information regarding the imaging range from the internal memory 50 or the like and specifies the positional relationship between the optical image and the imaging range based on the information. After that, the control unit 40 causes the display device 35 to display the marker F in a region (strictly speaking, a region corresponding to the boundary of the imaging range) corresponding to the imaging range based on the specified positional relationship. At this time, the marker F is displayed in a state in which the correction for aberration reduction is not performed, and in an easy-to-understand manner, is displayed in a distorted state with the same degree of distortion as the optical image, as shown in FIG. 21.

With the above, the image P can be observed in a state in which the distortion is suppressed even in a case where the optical image appears distorted because of the distortion of the lens. On the other hand, since the marker F is displayed in a distorted state in conformity with the optical image, it is possible to correctly grasp the imaging range in the optical image.

In the above case, the marker F is displayed in a state in which the correction for aberration reduction is not performed, but the present invention is not limited to this. The marker F may be displayed in a state in which the correction weaker than that of the image is performed. The weak correction means that the degree to which the distortion is reduced by the correction, that is, the correction amount in a case of performing correction such that the distortion is eliminated, is small.

Other Embodiments

The embodiments that have been described above are specific examples provided in order to describe the observation apparatus of the embodiments of the present invention in an easy-to-understand manner and are merely examples, and embodiments other than the above may be conceivable.

Figure 22:
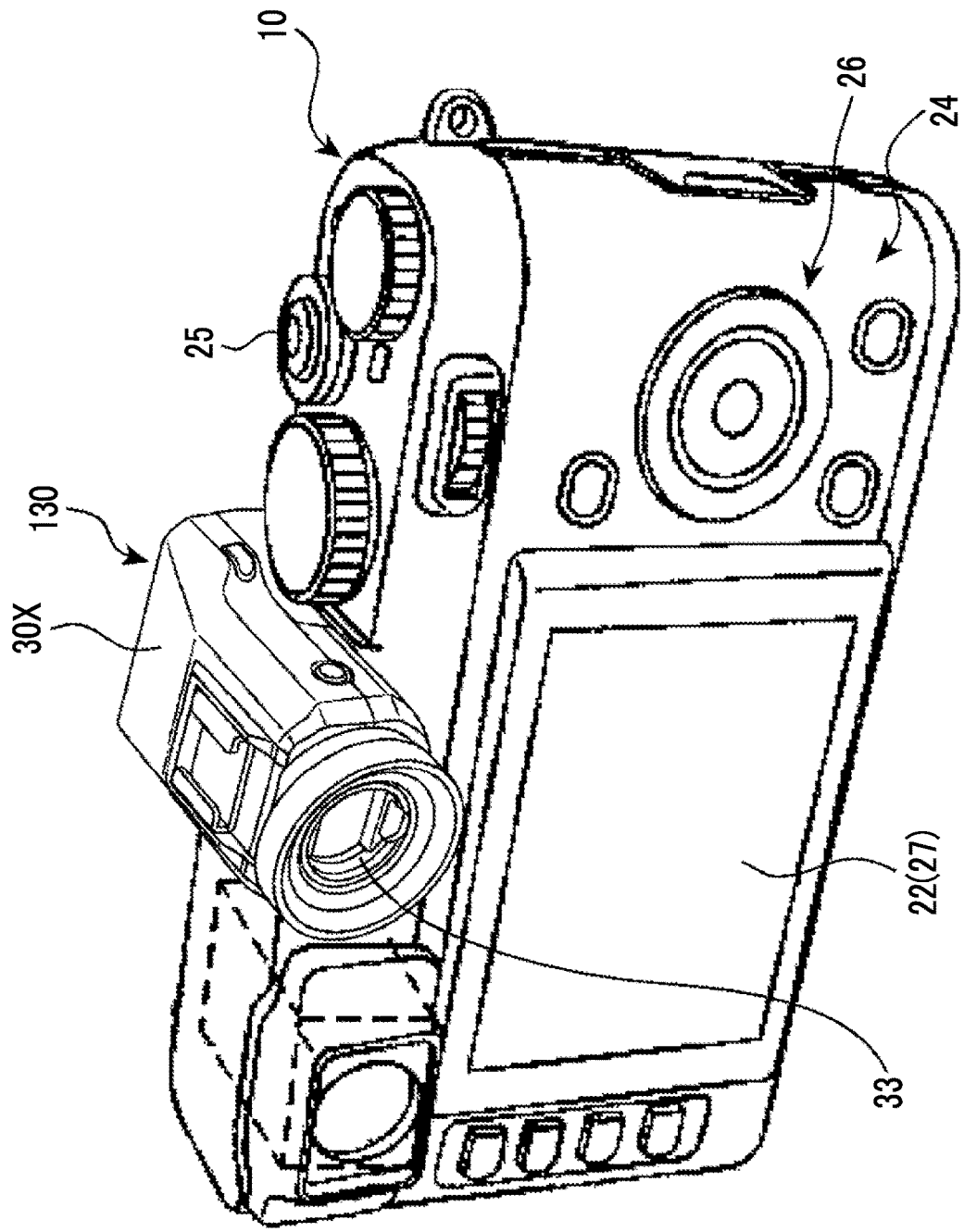
FIG. 22 is a diagram showing a modification example of the imaging apparatus and the observation apparatus according to one embodiment of the present invention.

In the above-described embodiment, a configuration in which the observation apparatus 30 is incorporated in the imaging apparatus 10 has been described, but the present invention is not limited to this. As shown in FIG. 22, a configuration may be employed in which an external observation apparatus 130 is attachably and detachably connected to the upper part of the main body of the imaging apparatus 10 via a connecting portion 14 (see FIG. 1).

Figure 23:
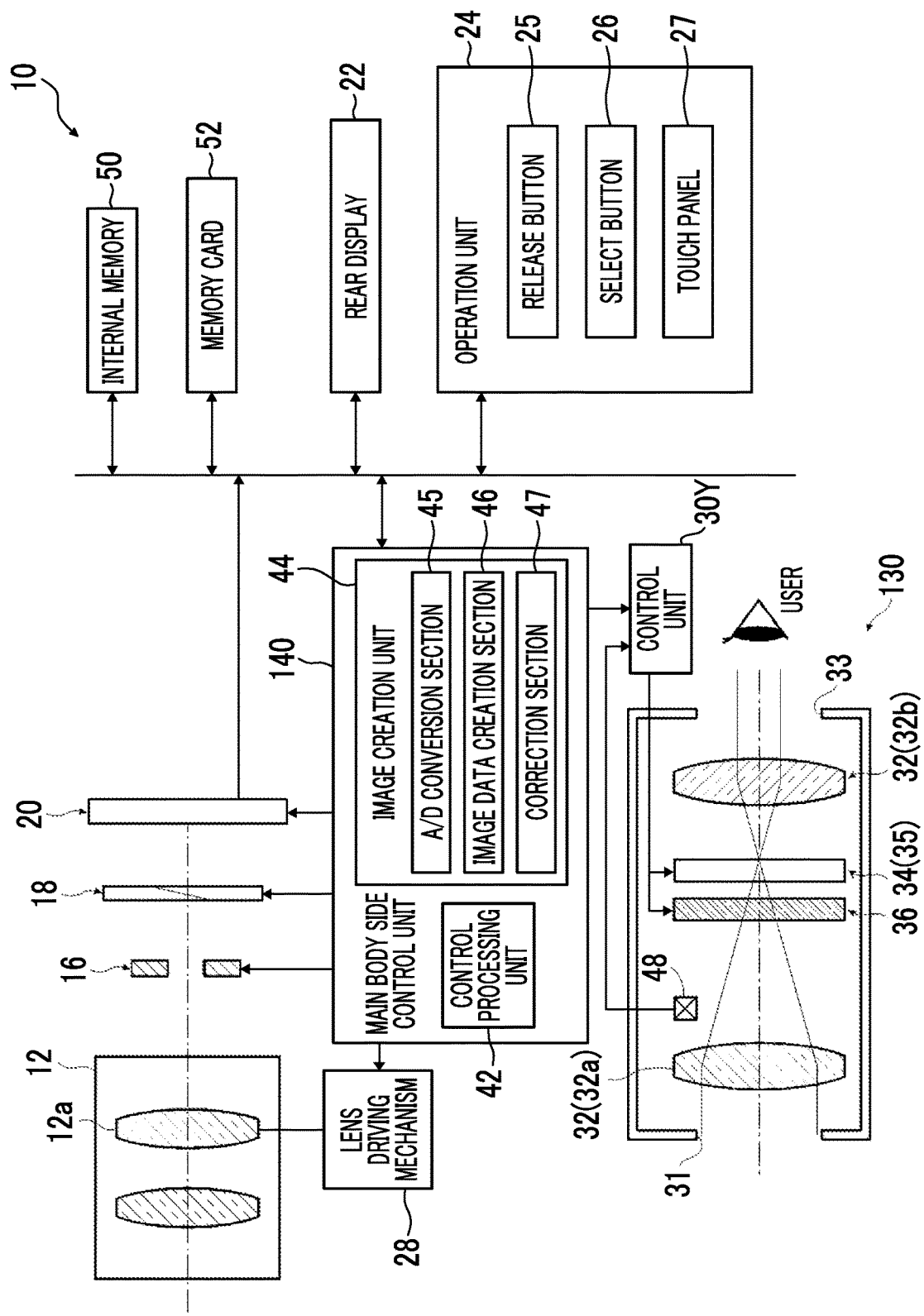
FIG. 23 is a diagram showing a modification example of the configuration of the imaging apparatus and the observation apparatus according to one embodiment of the present invention.

Further, in the above-described embodiment, the control unit 40 that controls each part of the observation apparatus 30 is composed of the processor provided in the imaging apparatus 10. That is, in the above-described embodiment, the observation apparatus 30 for the imaging apparatus 10 including the control unit 40 has been described, but the present invention is not limited to this. For example, as shown in FIG. 23, the external observation apparatus 130 may include a control unit 30Y that controls each part of an observation apparatus main body 30X, separately from the control unit of the imaging apparatus main body (hereinafter, referred to as a main body side control unit 140). That is, a processor incorporated in the external observation apparatus 130 may constitute the control unit 30Y, and the control unit 30Y may execute processing related to the image display in the observation apparatus 130, such as the detection processing and the control processing. In addition, both the main body side control unit 140 and the control unit 30Y of the observation apparatus 130 may execute processing related to the image display in the observation apparatus 130, such as the detection processing and the control processing.

In addition, although the HVF for a digital camera has been described in the above-described embodiment, the present invention can also be applied to an HVF used in an imaging apparatus (for example, a video camera, a smartphone, or the like) other than the digital camera.

Figure 24:
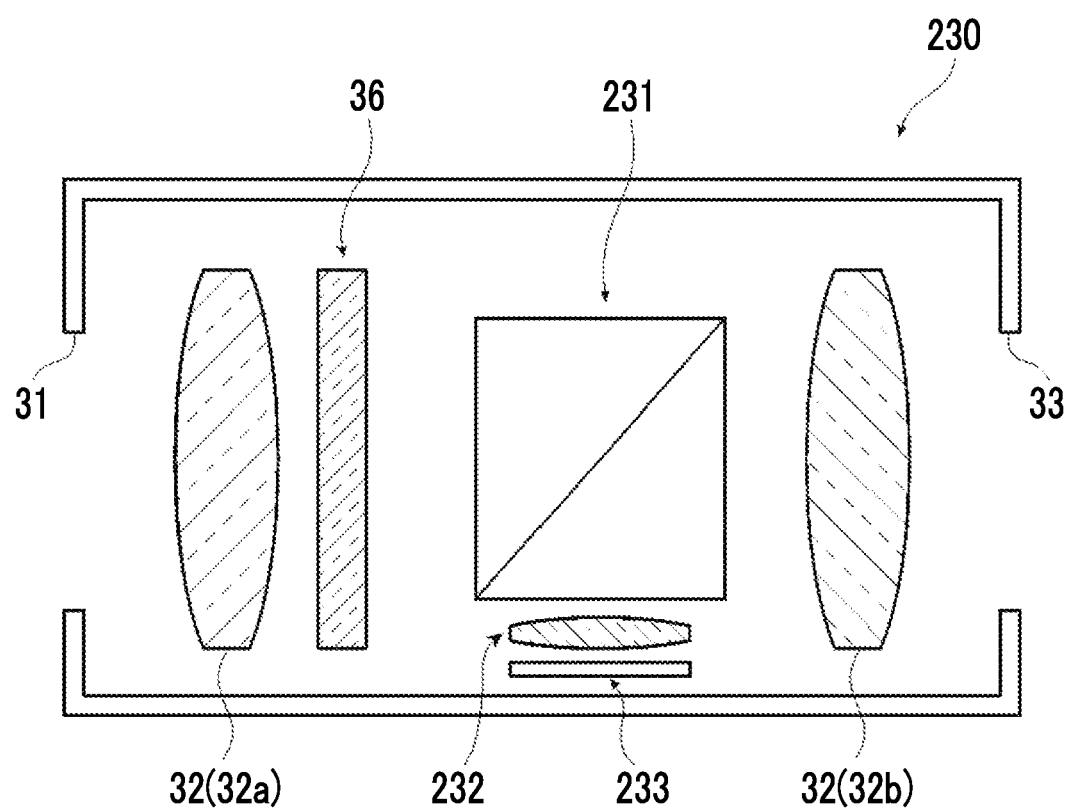
FIG. 24 is a diagram showing a modification example of an internal configuration of the observation apparatus.

In addition, in the above-described embodiment, as an example of the observation apparatus that displays the image by superimposing the image on the optical image, the observation apparatus 30 provided with the light transmissive display device 35 has been described, but the present invention is not limited to this. For example, as shown in FIG. 24, an observation apparatus 230 that superimposes an image on an optical image and display the image may be used in which a prism 231 constituting a beam splitter is disposed in the optical path of the optical image, and an image of a display device 233 passing through the lens 232 is reflected at a right angle by the prism 231.

From the above description, the observation apparatus described in the following appendixes can be grasped.

APPENDIX 1

An observation apparatus that is for an imaging apparatus including an imaging element and is controlled by a processor, the observation apparatus comprising:
 a lens that forms an optical image of a subject in an observable manner by a user;
 a transmissive display that displays an image in an observable manner by the user; and
 a light shielding mechanism of which a light shielding rate is variable by an electrical signal,
 in which the optical image has a first optical region and a second optical region,
 the image is an image based on a signal generated by the imaging element,
 the transmissive display superimposes the image on the first optical region to display both the image and the optical image in an observable manner by the user,
 the light shielding mechanism is disposed in an optical path between the subject and the transmissive display and has a first light shielding region to be superimposed on the first optical region and a second light shielding region to be superimposed on the second optical region, and
 the processor controls, with respect to the light shielding mechanism, light shielding rates of the first light shielding region and of the second light shielding region based on an intensity of ambient light.

APPENDIX 2

The observation apparatus according to Appendix 1,
in which the processor is configured to:
 control, with respect to the light shielding mechanism, the light shielding rates of the first light shielding region and of the second light shielding region based on an output signal of a sensor that outputs a signal corresponding to the intensity.

APPENDIX 3

The observation apparatus according to Appendix 2,
in which the imaging element generates a signal obtained by imaging a part of the subject to be observed as the optical image, and
the processor is configured to control the light shielding rate of the first light shielding region based on the signal generated by the imaging element and the output signal of the sensor.

APPENDIX 4

The observation apparatus according to any one of Appendixes 1 to 3,
 in which an end part of the first light shielding region is located outward of an end part of a display region of the image.

APPENDIX 5

The observation apparatus according to any one of Appendixes 1 to 4,
 in which the processor is configured to control a light shielding rate of an end part region of the second light shielding region to be lower than a light shielding rate of a central region of the second light shielding region.

APPENDIX 6

The observation apparatus according to any one of Appendixes 1 to 5,
 in which the image is displayed in a part of the transmissive display, which corresponds to the first optical region, in a state in which the optical image is transmitted through the transmissive display such that the user observes both the image and the optical image through the observation apparatus.

APPENDIX 7

The observation apparatus according to any one of Appendixes 1 to 6,
 in which an image of an in-focus region and an image of an out-of-focus region other than the in-focus region are present in the image, and
 the processor is configured to control a light shielding rate of a region of the first light shielding region, which overlaps the image of the in-focus region, to be higher than a light shielding rate of a region overlapping the image of the out-of-focus region.

APPENDIX 8

The observation apparatus according to any one of Appendixes 1 to 6,
 in which an image of an in-focus region and an image of an out-of-focus region other than the in-focus region are present in the image, and
 a display format of the image of the in-focus region is different from a display format of the image of the out-of-focus region.

APPENDIX 9

The observation apparatus according to any one of Appendixes 1 to 8,
in which the processor is configured to correct a gradation value corresponding to the signal generated by the imaging element,
the transmissive display displays the image based on the corrected gradation value, and
a correction amount for the gradation value is set according to the intensity.

APPENDIX 10

The observation apparatus according to any one of Appendixes 1 to 9,
in which the transmissive display displays a marker indicating an imaging range of the imaging element together with the image, and
in an overlapping region where a display region of the marker and a display region of the image overlap each other in the transmissive display, out of the marker and the image, one is preferentially displayed over the other.

APPENDIX 11

The observation apparatus according to Appendix 10,
in which, in the overlapping region, out of the marker and the image, one selected by the user is preferentially displayed over the other.

APPENDIX 12

The observation apparatus according to any one of Appendixes 1 to 11,
in which the observation apparatus is for the imaging apparatus including the processor.

APPENDIX 13

An observation apparatus that is for an imaging apparatus including an imaging element and is controlled by a processor, the observation apparatus comprising:
a lens that forms an optical image of a subject in an observable manner by a user;
a transmissive display that displays an image in an observable manner by the user; and
a light shielding mechanism of which a light shielding rate is variable by an electrical signal,
in which the optical image has a first optical region and a second optical region,
the transmissive display superimposes the image on the first optical region to display both the image and the optical image in an observable manner by the user,
the light shielding mechanism is disposed in an optical path between the subject and the transmissive display and has a plurality of light shielding regions to be superimposed on the first optical region and the second optical region, and
the processor is configured to read out, from a storage device that stores a display size of the image in the transmissive display and light shielding rates corresponding to the plurality of light shielding regions, the display size and the light shielding rates corresponding to the plurality of light shielding regions in response to an input operation of the user to execute control with respect to the transmissive display and the light shielding mechanism.

APPENDIX 14

The observation apparatus according to Appendix 13,
in which the display size and the light shielding rates corresponding to the plurality of light shielding regions are stored in the storage device in a state of being associated with any one of a plurality of modes, respectively,
the input operation is an operation in which the user designates any one of the plurality of modes, and
the processor is configured to read out the display size and the light shielding rates corresponding to the plurality of light shielding regions from the storage device based on a mode designated by the user.

APPENDIX 15

An observation apparatus that is for an imaging apparatus including an imaging element and is controlled by a processor, the observation apparatus comprising:
a lens that forms an optical image of a subject in an observable manner by a user; and
a transmissive display that displays an image in an observable manner by the user,
in which the optical image has a first optical region and a second optical region,
the transmissive display superimposes the image on the first optical region to display both the image and the optical image in an observable manner by the user, and overlays and displays a marker surrounding an imaging range by the imaging element on the second optical region,
the image is displayed in a state in which correction corresponding to distortion due to the lens is performed, and
the marker is displayed in a state in which the correction is not performed or in a state in which correction weaker than the correction of the image is performed, based on a positional relationship between the imaging range and the optical image to be observed in a state in which the distortion has occurred.

EXPLANATION OF REFERENCES

10: imaging apparatus
12: imaging lens
12a: focus lens
14: connecting portion
16: stop
18: shutter
20: imaging element
22: rear display
24: operation unit
26: select button
27: touch panel
28: lens driving mechanism
30: observation apparatus
30X: observation apparatus main body
30Y: control unit
32: optical system
32a, 32b: lens
34: display mechanism
35: display device 35a: first display region
35b: second display region
36: light shielding mechanism
36a: first light shielding region
36b: second light shielding region
40: control unit
42: control processing unit
44: image creation unit
45: A/D conversion section
46: image data creation section
47: correction section
48: sensor
50: internal memory
52: memory card
130: observation apparatus
140: main body side control unit
230: observation apparatus
231: prism
232: lens
233: display device
EI: setting information
F: marker
OP1: first optical region
OP2: second optical region
P: image

What is claimed is:

1. An observation apparatus that is for an imaging apparatus including an imaging element and is controlled by a control unit, the observation apparatus comprising:
   an optical system that forms an optical image of a subject in an observable manner by a user;
   a display mechanism that displays an image in an observable manner by the user; and
   a light shielding mechanism of which a light shielding rate is variable by an electrical signal,
   wherein the light shielding mechanism is selected from a polymer-dispersed liquid crystal panel, an electrochromic sheet, or a neutral density filter,
   the optical image has a first optical region and a second optical region,
   the imaging element generates a signal obtained by imaging a part of the subject to be observed as the optical image,
   the image is an image based on a signal generated by the imaging element,
   the display mechanism superimposes the image on the first optical region to display both the image and the optical image in an observable manner by the user,
   the light shielding mechanism is disposed in an optical path between the subject and the display mechanism and has a first light shielding region to be superimposed on the first optical region and a second light shielding region to be superimposed on the second optical region,
   the light shielding rate of the light shielding mechanism varies according to an electrical signal input to the light shielding mechanism and can be controlled for each region by the control unit,
   control processing of controlling light shielding rates of the first light shielding region and of the second light shielding region based on an output signal of a sensor that outputs a signal corresponding to an intensity of ambient light is executed by the control unit with respect to the light shielding mechanism, and
   in the control processing, the light shielding rate of the first light shielding region is controlled based on the signal generated by the imaging element and the output signal of the sensor.

2. The observation apparatus according to claim 1,
   wherein an end part of the first light shielding region is located outward of an end part of a display region of the image.

3. The observation apparatus according to claim 1,
   wherein the display mechanism includes a display device having light transmittance, and
   the image is displayed in a part of the display device, which corresponds to the first optical region, in a state in which the optical image is transmitted through the display device such that the user observes both the image and the optical image through the observation apparatus.

4. The observation apparatus according to claim 1,
   wherein an image of an in-focus region and an image of an out-of-focus region other than the in-focus region are present in the image, and
   a display format of the image of the in-focus region is different from a display format of the image of the out-of-focus region.

5. The observation apparatus according to claim 1,
   wherein correction processing of correcting a gradation value corresponding to the signal generated by the imaging element is performed by the control unit based on a control pattern corresponding to the intensity out of a plurality of control patterns,
   the display mechanism displays the image based on the corrected gradation value, and
   a correction amount for the gradation value in the correction processing is set based on the control pattern corresponding to the intensity.

6. The observation apparatus according to claim 1,
   wherein the observation apparatus is for the imaging apparatus including the control unit.

7. An observation apparatus that is for an imaging apparatus including an imaging element and is controlled by a control unit, the observation apparatus comprising:
   an optical system that forms an optical image of a subject in an observable manner by a user;
   a display mechanism that displays an image in an observable manner by the user; and
   a light shielding mechanism of which a light shielding rate is variable by an electrical signal,
   wherein the light shielding mechanism is selected from a polymer-dispersed liquid crystal panel, an electrochromic sheet, or a neutral density filter,
   the optical image has a first optical region and a second optical region,
   the image is an image based on a signal generated by the imaging element,
   the display mechanism superimposes the image on the first optical region to display both the image and the optical image in an observable manner by the user,
   the light shielding mechanism is disposed in an optical path between the subject and the display mechanism and has a first light shielding region to be superimposed on the first optical region and a second light shielding region to be superimposed on the second optical region,
   the light shielding rate of the light shielding mechanism varies according to an electrical signal input to the light shielding mechanism and can be controlled for each region by the control unit,
   control processing of controlling light shielding rates of the first light shielding region and of the second light shielding region based on an intensity of ambient light is executed by the control unit with respect to the light shielding mechanism, and in the control processing, a light shielding rate of an end part region of the second light shielding region is controlled to be lower than a light shielding rate of a central region of the second light shielding region.

8. An observation apparatus that is for an imaging apparatus including an imaging element and is controlled by a control unit, the observation apparatus comprising:
an optical system that forms an optical image of a subject in an observable manner by a user;
a display mechanism that displays an image in an observable manner by the user; and
a light shielding mechanism of which a light shielding rate is variable by an electrical signal,
wherein the light shielding mechanism is selected from a polymer-dispersed liquid crystal panel, an electrochromic sheet, or a neutral density filter,
the optical image has a first optical region and a second optical region,
the image is an image based on a signal generated by the imaging element,
an image of an in-focus region and an image of an out-of-focus region other than the in-focus region are present in the image,
the display mechanism superimposes the image on the first optical region to display both the image and the optical image in an observable manner by the user,
the light shielding mechanism is disposed in an optical path between the subject and the display mechanism and has a first light shielding region to be superimposed on the first optical region and a second light shielding region to be superimposed on the second optical region,
the light shielding rate of the light shielding mechanism varies according to an electrical signal input to the light shielding mechanism and can be controlled for each region by the control unit,
control processing of controlling light shielding rates of the first light shielding region and of the second light shielding region based on an intensity of ambient light is executed by the control unit with respect to the light shielding mechanism, and
in the control processing, a light shielding rate of a region of the first light shielding region, which overlaps the image of the in-focus region, is controlled to be higher than a light shielding rate of a region overlapping the image of the out-of-focus region.

9. An observation apparatus that is for an imaging apparatus including an imaging element and is controlled by a control unit, the observation apparatus comprising:
an optical system that forms an optical image of a subject in an observable manner by a user;
a display mechanism that displays an image in an observable manner by the user; and
a light shielding mechanism of which a light shielding rate is variable by an electrical signal,
wherein the light shielding mechanism is selected from a polymer-dispersed liquid crystal panel, an electrochromic sheet, or a neutral density filter,
the optical image has a first optical region and a second optical region,
the image is an image based on a signal generated by the imaging element,
the display mechanism superimposes the image on the first optical region to display both the image and the optical image in an observable manner by the user,
the display mechanism displays a marker indicating an imaging range of the imaging element together with the image,
in an overlapping region where a display region of the marker and a display region of the image overlap each other in the display mechanism, out of the marker and the image, one selected by the user is preferentially displayed over the other,
the light shielding mechanism is disposed in an optical path between the subject and the display mechanism and has a first light shielding region to be superimposed on the first optical region and a second light shielding region to be superimposed on the second optical region,
the light shielding rate of the light shielding mechanism varies according to an electrical signal input to the light shielding mechanism and can be controlled for each region by the control unit, and
control processing of controlling light shielding rates of the first light shielding region and of the second light shielding region based on an intensity of ambient light is executed by the control unit with respect to the light shielding mechanism.

* * * * *